(12) United States Patent
Gretz

(10) Patent No.: US 7,518,061 B1
(45) Date of Patent: Apr. 14, 2009

(54) RECESSED ELECTRICAL BOX

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 12/286,711

(22) Filed: Oct. 1, 2008

Related U.S. Application Data

(63) Continuation of application No. 11/980,063, filed on Oct. 30, 2007, now Pat. No. 7,435,900, which is a continuation of application No. 11/655,299, filed on Jan. 19, 2007, now Pat. No. 7,294,781, which is a continuation-in-part of application No. 11/356,590, filed on Feb. 16, 2006, now Pat. No. 7,166,801, which is a continuation-in-part of application No. 11/264,857, filed on Nov. 2, 2005, now Pat. No. 7,045,713, which is a continuation-in-part of application No. 11/246,985, filed on Oct. 7, 2005, now Pat. No. 7,064,271, which is a continuation-in-part of application No. 11/185,256, filed on Jul. 20, 2005, now Pat. No. 7,115,820, which is a continuation-in-part of application No. 11/102,392, filed on Apr. 8, 2005, now Pat. No. 7,151,219, which is a continuation-in-part of application No. 11/070,344, filed on Mar. 2, 2005, now Pat. No. 6,965,078, which is a continuation-in-part of application No. 11/009,116, filed on Dec. 10, 2004, now Pat. No. 7,005,578, which is a continuation-in-part of application No. 10/863,942, filed on Jun. 9, 2004, now Pat. No. 6,956,171.

(51) Int. Cl.
*H01H 9/02* (2006.01)

(52) U.S. Cl. .............................. 174/58; 174/57; 174/63; 174/50; 248/906; 439/535

(58) Field of Classification Search ............ 174/50, 174/53, 480, 481, 57–59, 61–63, 66, 67, 174/135; 220/3.2, 3.3, 3.5, 3.6, 3.8, 4.02, 220/241, 242; 439/535, 536, 537, 538; 248/906; D13/152, 177; 33/528; 361/600, 642, 826
See application file for complete search history.

(56) References Cited

U.S. PATENT DOCUMENTS

| 3,288,910 | A | * | 11/1966 | Zerwes ................... 174/53 |
| 3,378,160 | A | * | 4/1968 | Ermanno ................ 220/3.6 |
| 4,059,327 | A | | 11/1977 | Vann |
| 4,194,644 | A | | 3/1980 | Narvaez |
| 4,265,365 | A | | 5/1981 | Boteler |
| 4,599,485 | A | * | 7/1986 | Smolik ................... 174/57 |

(Continued)

*Primary Examiner*—Dhiru R Patel

(57) ABSTRACT

A recessed electrical box with a closeable cover member and at least one outward extending flange. The flange serves as a positioning arrangement to recess the electrical box at the correct depth with respect to the surface in which it will be mounted. The recessed electrical box is comprised of two pieces, including a one-piece electrical box and a one-piece cover member. An inner flange may be included for positioning the recessed electrical box with respect to the outer surface of the substrate on an unfinished building. The inner flange is removable to facilitate installation on a finished building, in which the finish layer such as siding or stucco is installed. The recessed electrical box may include a second, outer flange, for recessing the box at the correct depth with respect to a wall surface.

12 Claims, 23 Drawing Sheets

U.S. PATENT DOCUMENTS

| | | | |
|---|---|---|---|
| 4,638,963 A | 1/1987 | Hernandez | |
| 4,847,444 A | 7/1989 | Holland | |
| 4,927,039 A | 5/1990 | McNab | |
| 4,936,794 A | 6/1990 | Shaw | |
| 4,988,832 A | 1/1991 | McShane | |
| 5,042,673 A * | 8/1991 | McShane | 220/3.7 |
| 5,117,996 A | 6/1992 | McShane | |
| 5,257,946 A | 11/1993 | MacMillan | |
| 5,280,135 A | 1/1994 | Berlin | |
| 5,389,740 A | 2/1995 | Austin | |
| 5,470,138 A * | 11/1995 | Kump | 312/34.4 |
| 4,364,015 A | 1/1997 | Taylor | |
| 5,600,093 A | 2/1997 | Herth | |
| 5,975,323 A | 11/1999 | Turan | |
| 6,232,553 B1 * | 5/2001 | Regen | 174/64 |
| 6,369,322 B1 | 4/2002 | Gretz | |
| 6,437,242 B1 | 8/2002 | Radosavljevic | |
| 6,563,051 B1 | 5/2003 | Shotey | |
| 6,737,576 B1 | 5/2004 | Dinh | |
| 6,753,471 B2 | 6/2004 | Johnson | |
| 6,808,079 B2 | 10/2004 | Lalancette | |
| 6,875,937 B1 | 4/2005 | Saviano | |
| 7,044,318 B2 | 5/2006 | Gates | |
| 7,214,876 B1 | 5/2007 | Haberek | |
| 7,276,661 B2 | 10/2007 | Wegner | |

\* cited by examiner

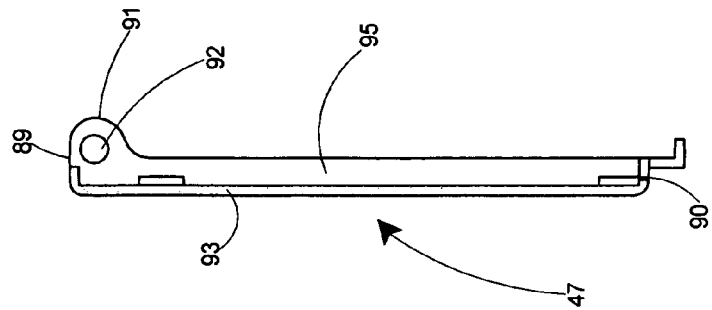
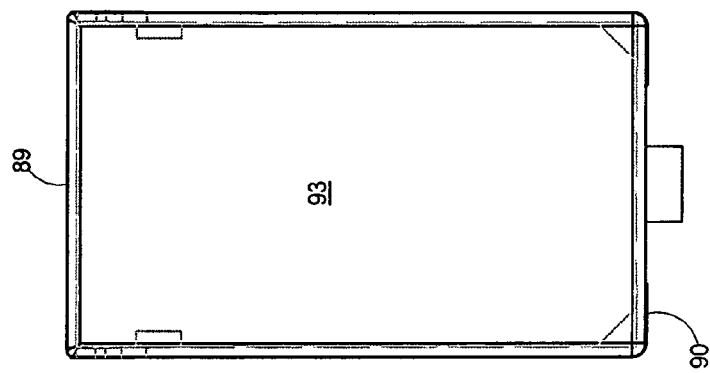
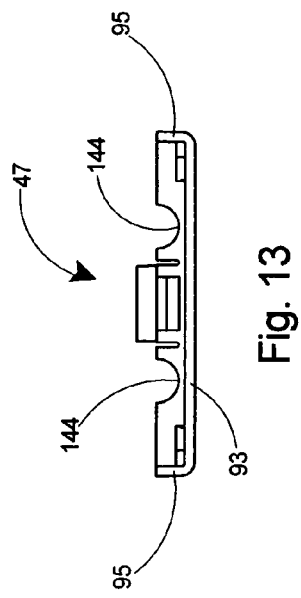
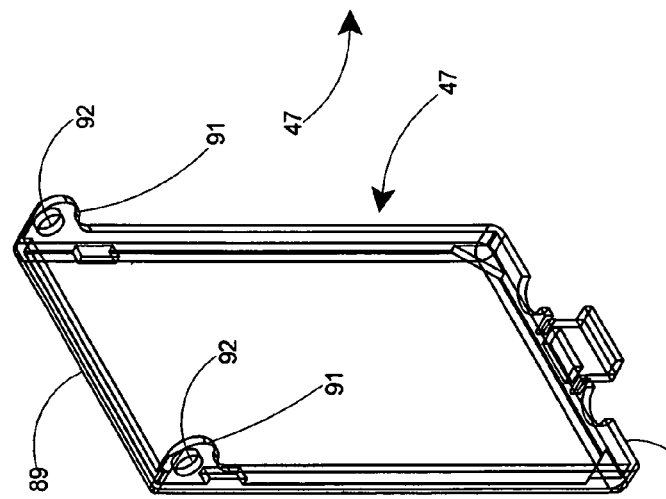
Fig. 11
Fig. 12
Fig. 13
Fig. 14

RECESSED ELECTRICAL BOX

This application is a Continuation of U.S. patent application Ser. No. 11/980,063, filed Oct. 30, 2007 and now U.S. Pat. No. 7,435,900, which is a Continuation of U.S. patent application Ser. No. 11/655,299 filed Jan. 19, 2007 and now U.S. Pat. No. 7,294,781, which is a Continuation-In-Part of U.S. patent application Ser. No. 11/356,590 filed Feb. 16, 2006 and now U.S. Pat. No. 7,166,801, which is a Continuation-In-Part of U.S. patent application Ser. No. 11/264,857, filed Nov. 2, 2005 and now U.S. Pat. No. 7,045,713, which is a Continuation-In-Part of U.S. patent application Ser. No. 11/246,985, filed Oct. 7, 2005 and now U.S. Pat. No. 7,064,271, which is a Continuation-In-Part of U.S. patent application Ser. No. 11/185,256, filed Jul. 20, 2005 and now U.S. Pat. No. 7,115,820, which is a Continuation-In-Part of U.S. patent application Ser. No. 11/102,392, filed Apr. 8, 2005 and now U.S. Pat. No. 7,151,219, which is a Continuation-In-Part of U.S. patent application Ser. No. 11/070,344, filed Mar. 2, 2005 and now U.S. Pat. No. 6,965,078, which is a Continuation-In-Part of U.S. patent application Ser. No. 11/009,116 filed Dec. 10, 2004 and now U.S. Pat. No. 7,005,578, which is a Continuation-In-Part of U.S. patent application Ser. No. 10/863,942 filed Jun. 9, 2004 and now U.S. Pat. No. 6,956,171, all of which are commonly owned by the assignee of the present invention and the entire contents of which are incorporated herein by reference.

FIELD OF THE INVENTION

This invention relates to electrical junction boxes and specifically to a recessed outlet box that secures an electrical device substantially behind the exterior of a building for accommodating and protecting a duplex outlet or other electrical device therein.

BACKGROUND OF THE INVENTION

Recessed electrical boxes for retrofitting on finished walls or for use in new construction were disclosed in U.S. Pat. Nos. 6,965,078, 6,956,171, 7,005,578, 7,045,713, 7,064,271, 7,115,820, 7,151,219, and 7,166,801 and in co-pending U.S. application Ser. No. 11/655,299, all of which are commonly owned by the assignee of the present invention and the entire contents of which are incorporated herein by reference.

The recessed electrical boxes disclosed in the aforementioned patents and applications comprised an electrical box having an inner enclosure for housing an electrical device and an outer enclosure for recessing the inner enclosure well within a wall. The recessed electrical box including the inner enclosure and outer enclosure were either integrally formed in one piece or provided in two pieces each formed of the same material of construction.

Although a recessed electrical box of the type described in the aforementioned disclosures provided an adequate means for recessing an electrical device substantially within the wall of a structure, they were directed primarily to recessing electrical devices on the exterior surface of a structure. Although the aforementioned patents and patent application provide an apparatus for recessing an electrical box on the exterior of a structure, there is also a need for recessing an electrical outlet on an interior wall of a structure.

Accordingly, the present invention provides a two-piece recessed electrical outlet assembly that includes a first portion that comprises an electrical box for mounting in an interior wall and housing and protecting an electrical outlet and its associated wiring. A second portion of the recessed assembly includes a frame member for covering the electrical box and a portion of the interior wall surrounding the box to obscure that portion of the wall surrounding the electrical box.

SUMMARY OF THE INVENTION

The invention is a recessed electrical box with a closeable cover member. The box may include a flange that serves as a positioning arrangement to recess the electrical box at the correct depth with respect to the surface in which it will be mounted. The recessed electrical box is comprised of two pieces, including a one-piece electrical box and a one-piece cover member. The cover member is of minimal size with respect to the electrical box to minimize the cost of construction. The electrical box can be installed on an exterior wall, including either as a retrofit on a finished building or as an installation on the wall of a building under construction. The outward extending flange may include an inner flange for positioning the recessed electrical box with respect to the outer surface of the substrate on a building under construction. The inner flange is removable to facilitate installation in a retrofit situation, in which the finish layer such as siding, stucco, or masonry is installed. The recessed electrical box may include a second, outer flange, for recessing the box at the correct depth with respect to a finished surface and to occlude from view the sidewalls of the box at their juncture with the finished surface.

OBJECTS AND ADVANTAGES

A first advantage of the recessed electrical box is that it properly recesses or positions the box at the proper depth with respect to the outer surface of the building. The electrical box may include one or more outward extending flanges that provide a positioning mechanism to recess the electrical box at the correct depth within the building's surface. The positioning mechanism is functional for both a retrofit situation, in which the finished layer such as siding or stucco is installed, or in a building under construction in which the finished layer has not been installed.

A second advantage is that a while-in-use cover member, which renders the recessed electrical box rainproof, is minimal in size with respect to the box. Cover members are typically molded of expensive impact resistant plastic to meet electrical code. Keeping the cover minimal in size with respect to the box lowers the cost of production of the outlet box.

A further advantage is that the recessed electrical box positions an enclosed electrical device substantially behind the outer surface of the building. This provides added protection to the electrical device and insures that any hard impacts that destroy the cover member do not also damage the electrical device.

The recessed electrical box furthermore provides the advantage of being constructed of a minimal number of parts. It includes only two separately molded pieces, including the electrical box and the cover member. Construction of the box is therefore simplified and production costs are minimized as compared to similar prior art electrical boxes.

A further advantage of the recessed electrical box is that the cover member is a while-in-use cover, allowing electrical cords to remain connected to the electrical outlet within the box with the cover member closed thereon. Therefore the recessed electrical box provides rainproof protection to the outlets even while electrical cords are connected to the electrical outlets therein.

The electrical box furthermore includes integral bosses with bores therein, which may be smooth or threaded bores, for accepting fasteners from standard wall-mounted electrical devices, such as outlets or switches.

These and other objects and advantages of the present invention will be better understood by reading the following description along with reference to the drawings.

DESCRIPTION OF THE DRAWINGS

FIG. 11 is a perspective view of a cover member used with the electrical box of the present invention.

FIG. 12 is a front view of the cover member of FIG. 11.

FIG. 13 is a side view of the cover member of FIG. 11.

FIG. 14 is a bottom view of the cover member of FIG. 11.

TABLE OF NOMENCLATURE

Figure 1:
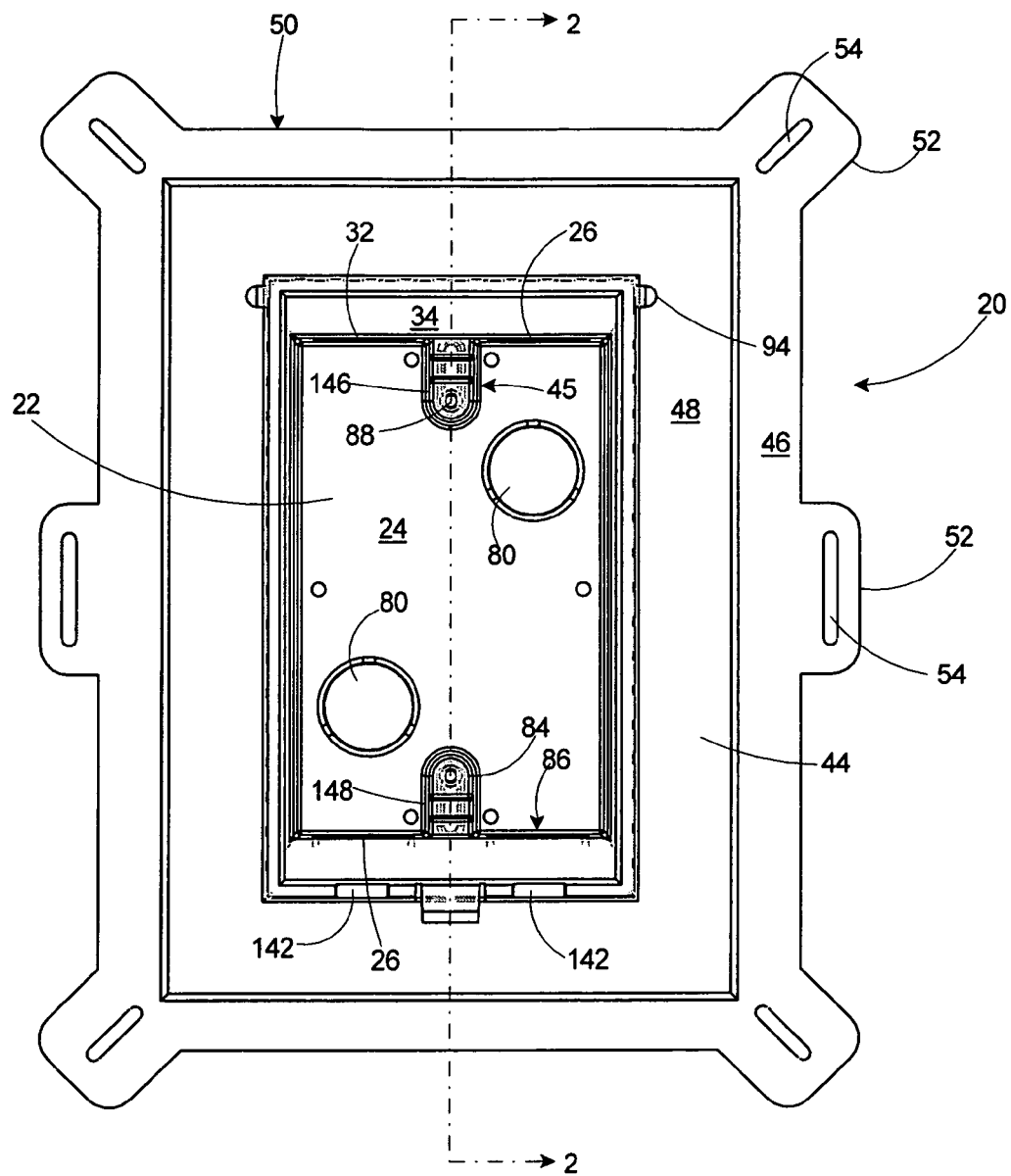
FIG. 1 is a front view of a first embodiment of a recessed electrical box according to the present invention.

The following is a listing of part numbers used in the drawings along with a brief description:

| | |
|---|---|
| 64 | third side of inner flange |
| 66 | fourth side of inner flange |
| 68 | outer periphery of second box |
| 70 | outer periphery of first box |
| 72 | plane of inner flange |
| 74 | plane of outer flange |
| 76 | apertures in outer flange |
| 80 | removable wall portion |
| 81 | circular cord opening |
| 84 | integral projections |
| 86 | inner surface of peripheral sidewalls |
| 88 | threaded bore |
| 89 | top end of cover member |
| 90 | bottom end of cover member |
| 91 | ear of cover member |
| 92 | aperture |
| 93 | front wall of cover member |
| 94 | post |
| 95 | stiffening side wall |
| 96 | cover arrangement |
| 97 | gap |
| 100 | recessed electrical box, second embodiment |
| 102 | hole in substrate, siding, or both |
| 104 | siding |
| 106 | substrate |
| 107 | caulking |
| 110 | recessed electrical box, third embodiment |
| 112 | stucco finish layer |
| 114 | holes in inner flange |
| 118 | fastener |
| 120 | hole in outer flange |
| 122 | back surface of outer flange |
| 124 | hole in outer flange |
| 126 | duplex outlet |
| 128 | device fasteners |
| 130 | faceplate |
| 132 | terminal of duplex outlet |
| 134 | plug end |
| 136 | electrical cord |
| 138 | outside surface of building |
| 139 | positioning arrangement |
| 140 | outer surface of substrate |
| 142 | U-shaped slots in box member |
| 144 | U-shaped slots in cover member |
| 146 | top boss |
| 148 | bottom boss |
| 150 | aperture in sidewalls of second box |
| 152 | inward-extending post on cover member |
| 154 | aperture in cover member |
| 156 | bolt |

-continued

| | |
|---|---|
| 158 | nut |
| 220 | recessed electrical outlet assembly, preferred embodiment |
| 222 | electrical box |
| 224 | frame member |
| 226 | front sidewall portion |
| 228 | rear sidewall portion |
| 230 | duplex receptacle |
| 232 | faceplate |
| 234 | peripheral sidewall of frame member |
| 235 | aperture in flange |
| 236 | flange |
| 238 | open rear end |
| 240 | fastening arrangement |
| 241 | boss in front sidewall of electrical box |
| 242 | bore |
| 244 | fastener |
| 246 | mounting arrangement |
| 248 | boss |
| 250 | captive fastener |
| 252 | axis |
| 254 | outer surface of front sidewalls |
| 256 | leg |
| 258 | head of fastener |
| 259 | front edge of front sidewall portion |
| 260 | rear edge of front sidewall portion |
| 262 | lateral wall |
| 264 | rear edge |
| 266 | rear wall |
| 268 | alignment tab |
| 270 | rear edge of alignment tab |
| 272 | outer surface of rear sidewalls |
| 274 | rib |
| 276 | axis |
| 278 | recessed area |
| 280 | recessed peripheral wall |
| 281 | knockout |
| 282 | front face |
| 284 | arrangement for securing an electrical device |
| 286 | device mounting boss |
| 288 | front face of boss |
| 290 | central opening of frame member |
| 292 | inner chamfered edge |
| 294 | outer chamfered edge |
| 296 | stud |
| 298 | front face of stud |
| 302 | fastener for electrical device |
| 304 | fastener for faceplate |
| 306 | sheetrock |
| 308 | plug end of electrical cord |
| 310 | push-in connector |
| D | distance flange extends outward from peripheral sidewall |
| W | outer width across peripheral wall of frame member |
| H | outer height across peripheral wall of frame member |
| W1 | inner width across front sidewalls of electrical box |
| H1 | inner height across front sidewalls of electrical box |
| θ | angle of fastener with respect to outer surface of sidewall |
| θ$_1$ | angle of fastener with respect to front edge of sidewall |

DETAILED DESCRIPTION OF THE INVENTION

The present invention comprises a recessed electrical box for securing an electrical device on the exterior wall of a building. The recessed electrical box has features that allow it to be easily recessed to the correct depth on either a new building or on an existing building. It can be installed on a new building having unfinished walls, in which the finishing surface, such as siding or stucco, will be installed later, or as a retrofit on an existing building.

With reference to FIGS. 1-4, a first embodiment of a recessed electrical box 20 according to the present invention is shown. The recessed electrical box includes a first box 22 having a back wall 24, peripheral sidewalls 26 extending orthogonally to the back wall 24, and a front opening 28 defining a cavity or first enclosure 30 therein. The peripheral sidewalls 26 of the first box 22 include a front edge 32 at the front opening 28. A transverse wall portion 34 extends outwardly and orthogonally from the peripheral sidewalls 26 at the front edge 32. Second peripheral sidewalls 36 extend orthogonally from the transverse wall portion 34 and form a second box 38 and a second enclosure 40 therein. The first box 22 and second box 38 may be molded in one piece from plastic and form a one-piece box member 41. Alternatively, the first box 22 and second box 38 may be formed of metal in one piece, or each box 22, 38 formed of metal and then secured together by conventional means. The second peripheral sidewalls 36 terminate in a planar front edge 42. The planar front edge 42 includes a front opening 44 therein leading into the second enclosure 40. A securement arrangement 45 at the front opening 28 of the first enclosure 30 is capable of accepting an electrical device (not shown) therein. A cover member 47 is pivotally attached to the box member 41 to form a recessed electrical box 20 according to the present invention.

Figure 2A:
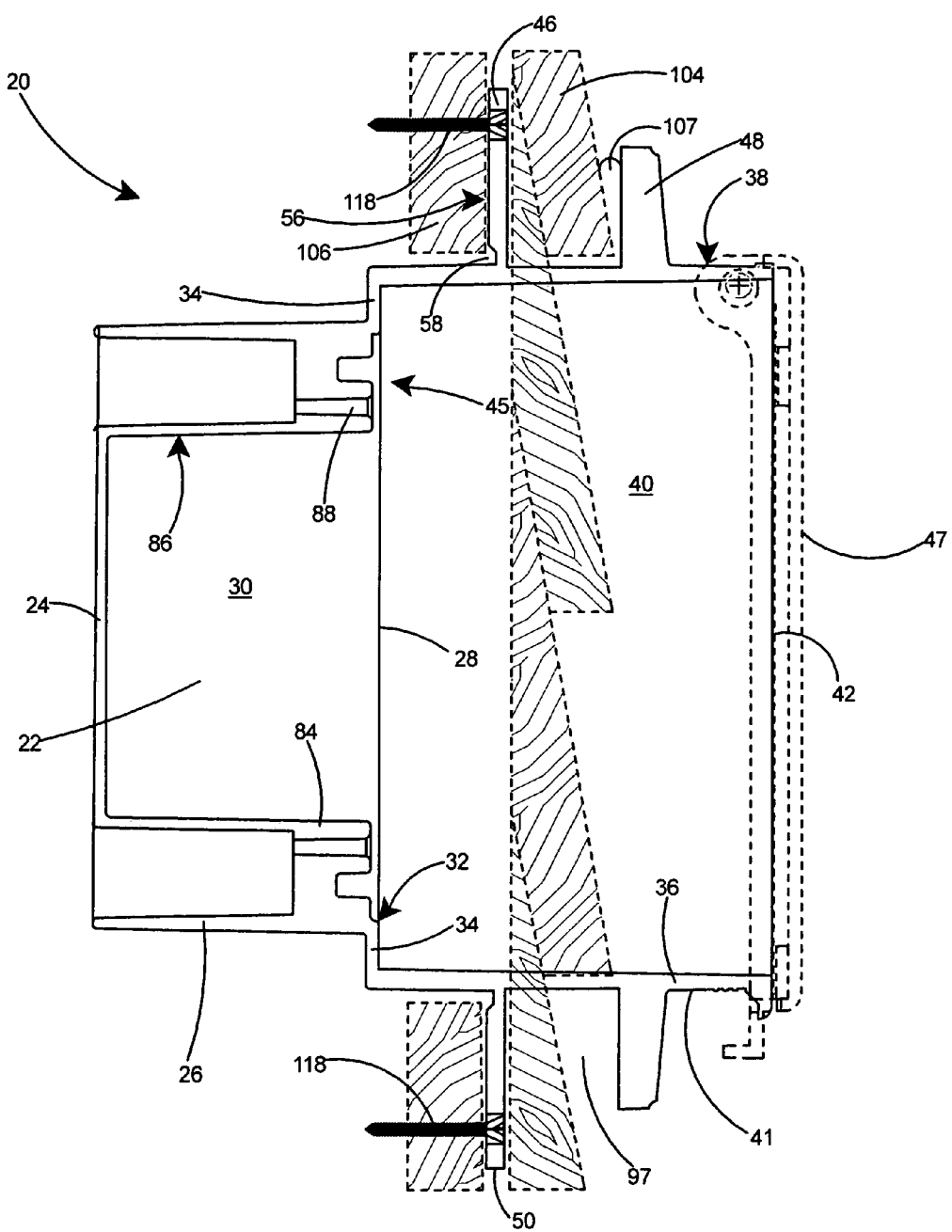
FIG. 2A is a sectional view of the recessed electrical box taken along line 2-2 of FIG. 1 and shown mounted to the substrate of a newly constructed building.
Figure 4:
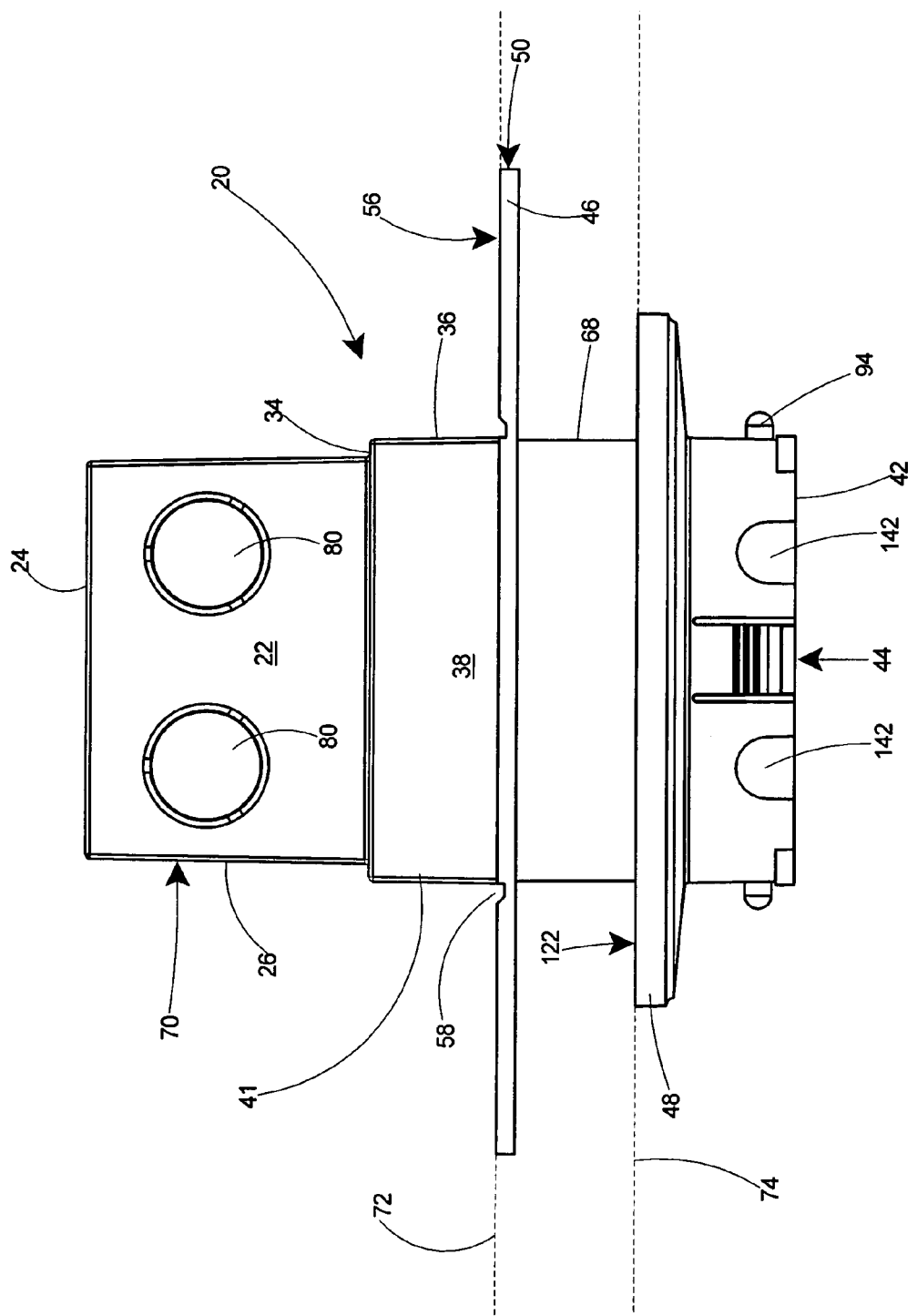
FIG. 4 is a bottom view of the electrical box of FIG. 1.
Figure 5:
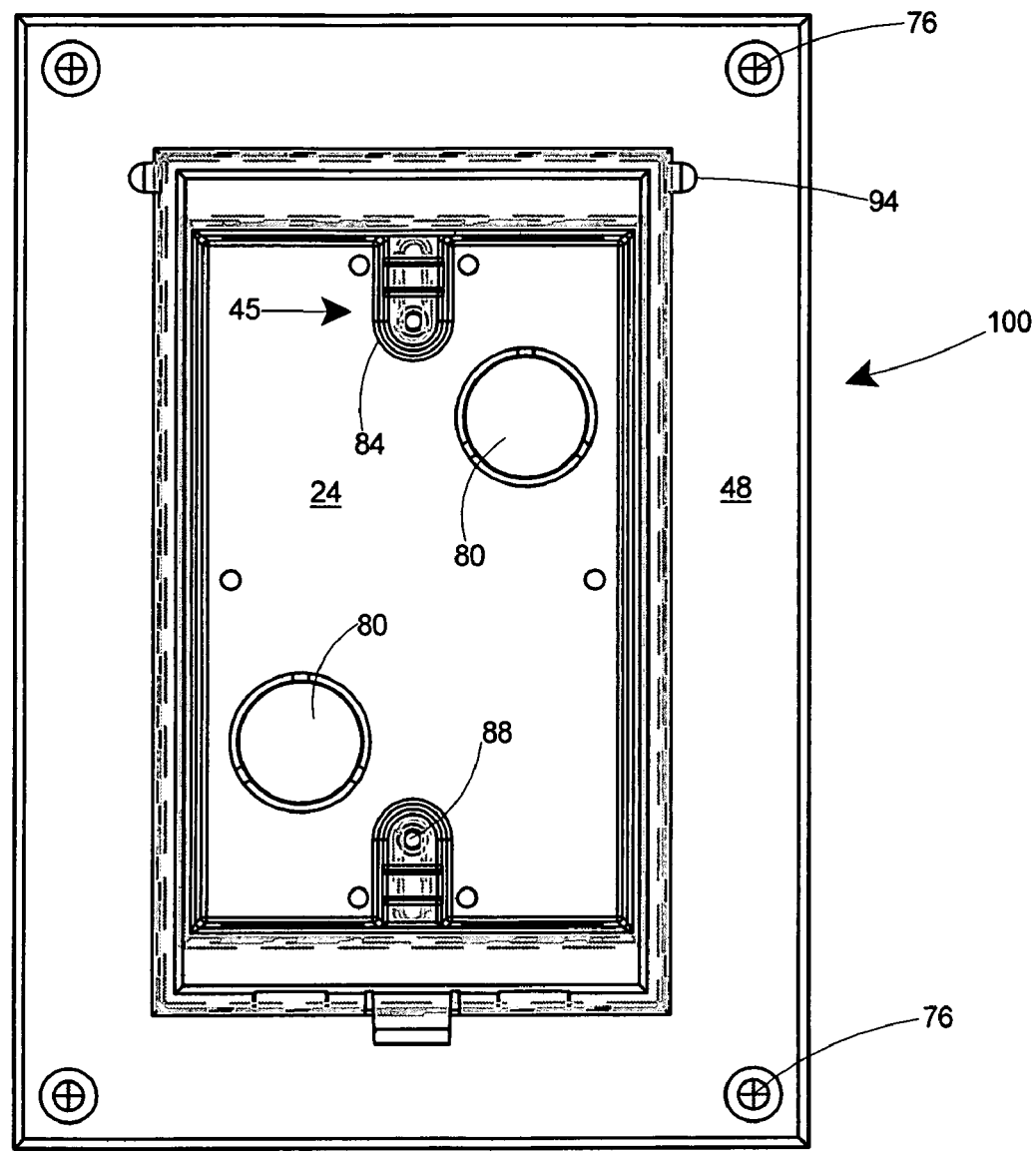
FIG. 5 is a front view of a second embodiment of a recessed electrical box according to the present invention.

The recessed electrical box of the present invention may include at least one flange integral with and extending outwardly and orthogonally from the second peripheral sidewalls. For the first embodiment, as shown in FIGS. 2A and 4, the recessed electrical box 20 includes an inner flange 46 and an outer flange 48. As shown in FIGS. 1 and 4, the inner flange 46 extends transversely substantially beyond the outer flange 48. The outer flange 48 extends transversely substantially beyond the second peripheral sidewalls 36. The inner flange 46 includes an outer edge 50 and a plurality of ears 52 extending beyond the outer edge 50. A slot 54 is included in each of the ears 52 of the inner flange 46.

Figure 3:
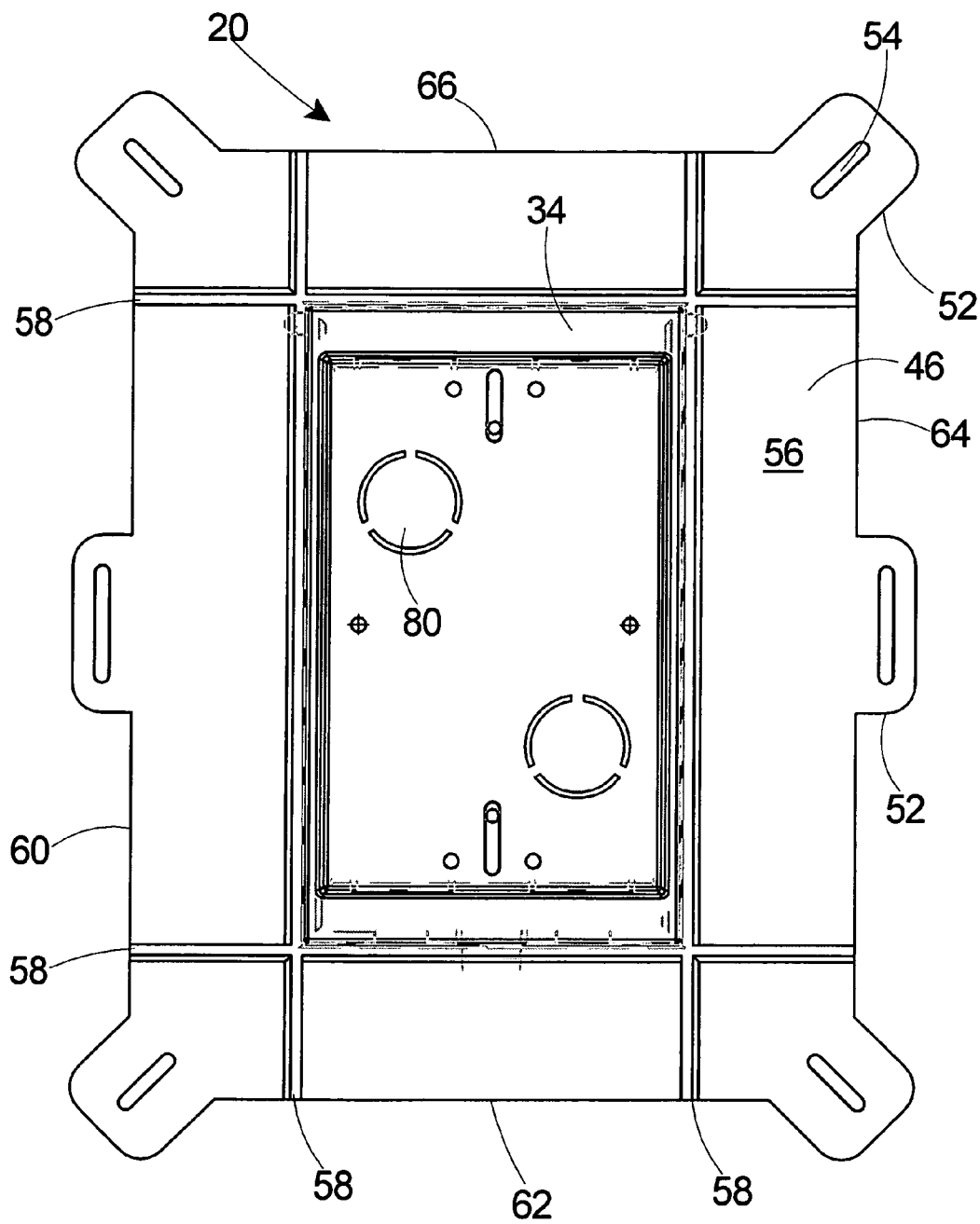
FIG. 3 is back view of the electrical box of FIG. 1.

Referring to FIGS. 2A and 3, the back surface 56 of the inner flange 46 includes grooves 58 adjacent each of the second peripheral sidewalls 36. The grooves 58 extend from one side 60, 62 of the outer edge 50 to the corresponding opposing side 64, 66 of the outer edge 50. The grooves 58 form reduced thickness flange portions to allow scoring therein to remove the inner flange 46 adjacent the second peripheral sidewalls 36.

With reference to FIG. 4, the second box 38 has an outer periphery 68 that, as a result of the outwardly extending transverse wall portion 34, is larger than the outer periphery 70 of the first box 22. The inner 46 and outer 48 flanges are in parallel planes 72, 74. Removal of the inner flange 46 creates an outer surface substantially equal to the outer periphery 68 of the second box 38 or, in other words, scoring along the grooves 58 adjacent the outer periphery 68 and subsequently breaking off the inner flange 46 creates a smooth outer periphery with the inner flange 46 completely removed therefrom. The outer flange 48, as shown in FIG. 4, extends substantially beyond the second peripheral sidewalls 36.

Referring to FIGS. 1 and 4, the back wall 24 and the peripheral sidewalls 26 of the first box 22 include one or more removable wall portions 80 or knockouts, which may be removed to provide a passage for wiring into the first box 22. The second peripheral sidewalls 36 of the second box 38 also include one or more U-shaped slots 142 extending therein from the front edge 42 at the front opening 44.

With reference to FIGS. 1 and 2A, the recessed electrical box further includes a securement arrangement 45. The securement arrangement 45 includes integral projections 84 from the inner surface 86 of the peripheral sidewalls 26 that extend transversely into the first enclosure 30. The integral projections 84 include bores 88 therein, which may be smooth bores or threaded.

The recessed electrical box can further include a cover member 47 having a top end 89, bottom end 90, ears 91 extending from the top end 89, and apertures 92 within the ears 91 as shown in FIGS. 11-14. The cover member 47 includes a front wall 93 and a stiffening side wall 95 that rigidifies and provides structural support to the front wall portion 93. The cover member 47, which much pass an impact test according to the electrical code, is typically constructed of high impact resistant plastic. The high impact resistant plastic is more expensive than typical non-impact resistant plastics that are used to construct the electrical box. The cover member 47 of the present invention is therefore made as small in size as possible to lower production costs. To lower the weight of high impact resistant plastic used, the stiffening side wall 95 extends no more than 0.30 inch from the front wall 93 and the front wall 93 is no greater than 3.5 inches width by 6.0 inches length. Therefore the largest volume component of the present invention consists of the box member 41, which is constructed of cheaper non-impact resistant plastics. The box member 41 is typically molded of non-impact resistant plastic in one piece. The cover member 47 is typically molded of high impact resistant plastic in one piece. The recessed electrical box of the present invention is therefore of two-piece construction, which is much simpler construction than the three or more piece prior art boxes.

Figure 18:
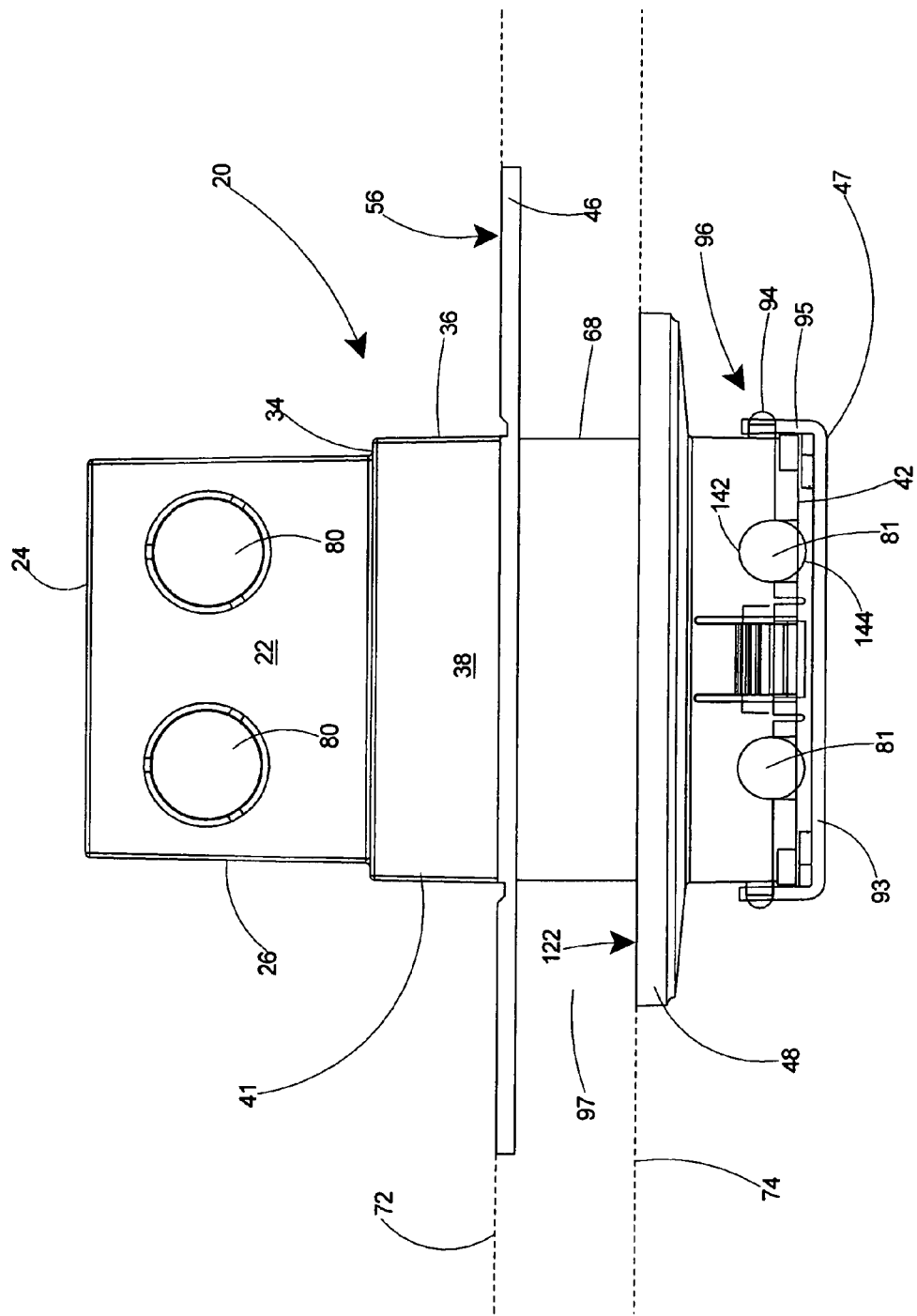
FIG. 18 is a bottom view of the recessed electrical box of FIG. 4 with the cover member attached thereto.

With reference to FIG. 18, the recessed electrical box 20 is provided with posts 94 near the planar front edge 42 of the second box 38 upon which the ears 91 of the cover member 47 are snapped thereover, with the posts 94 protruding through the apertures 92 in the ears 91, to cover the outer front opening 44 of the recessed electrical box 20. The cover member 47 is then pivotable on the posts 94. The posts 94 and cover member 47 comprise a cover arrangement 96 for closing the front opening 44 of the second box 38 in a rainproof closure. The inner 46 and outer 48 flanges of the recessed electrical box 20 reside in parallel planes 72, 74 and form a gap 97 therebetween around all four sides of the electrical box 20. The size of the gap 97 is between 0.7 to 0.9 inch to allow it to accept siding of most standard thicknesses.

Figure 8:
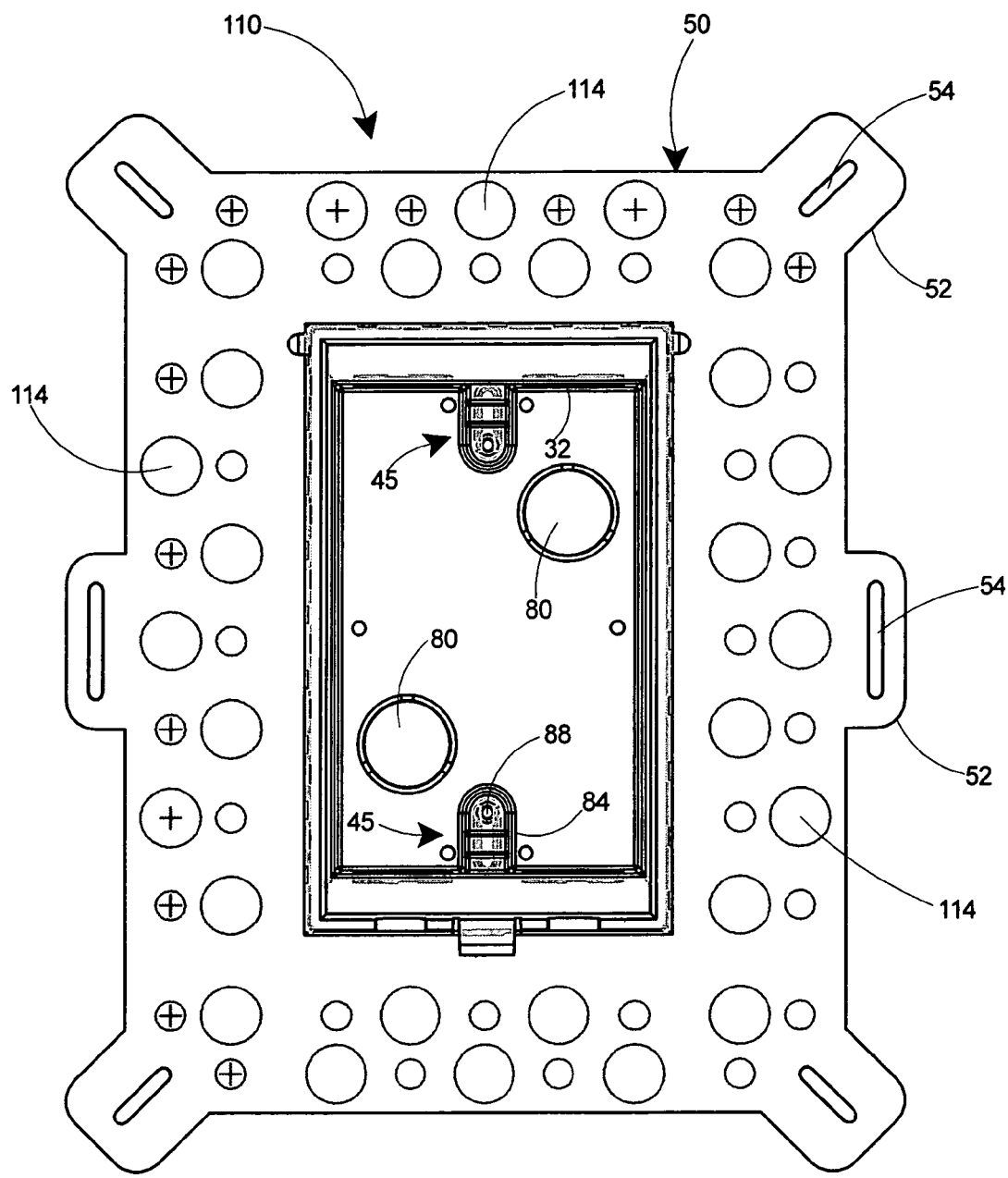
FIG. 8 is a front view of a third embodiment of a recessed electrical box according to the present invention.
Figure 9:
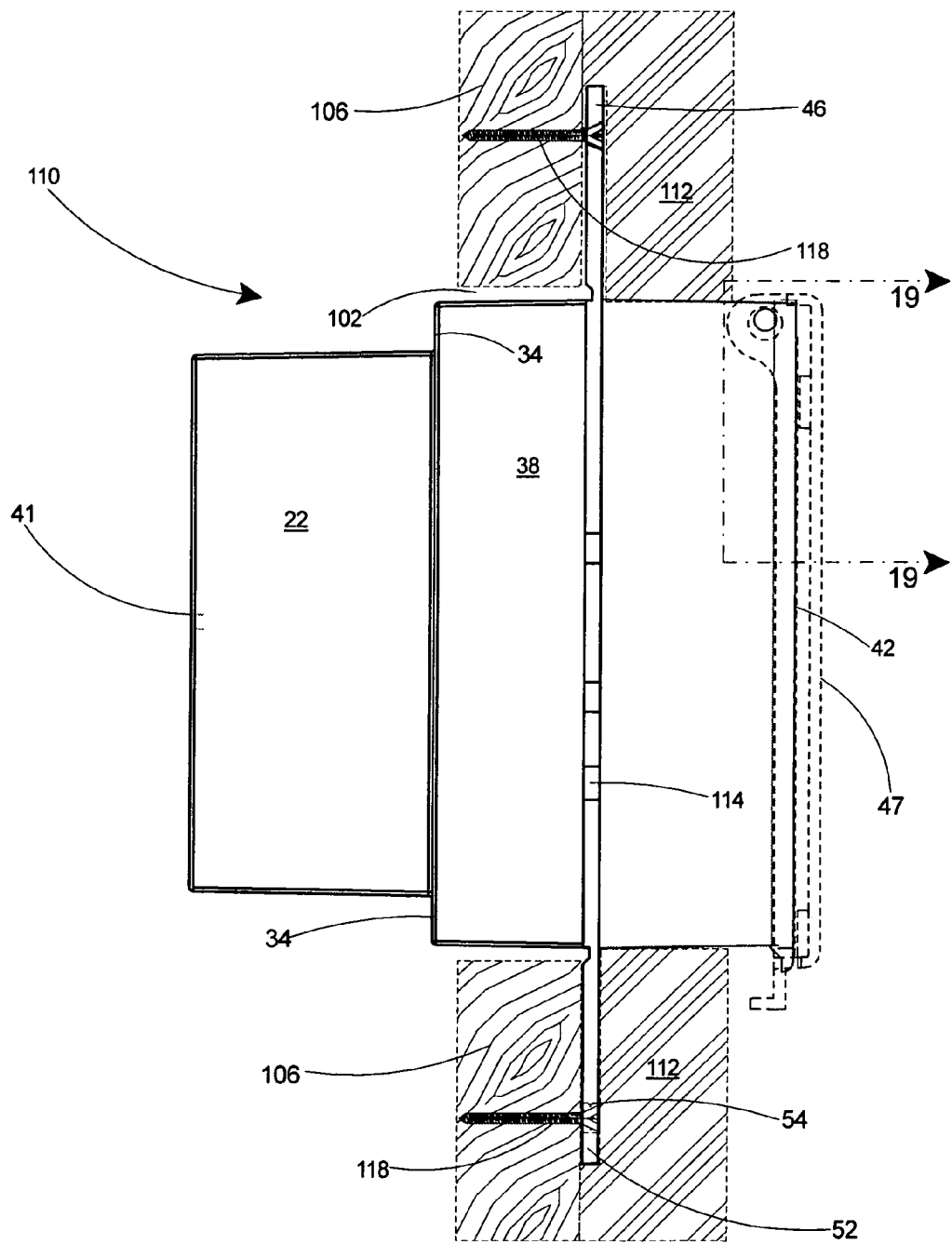
FIG. 9 is a side view of the recessed electrical box taken along line 9-9 of FIG. 8.
Figure 10:
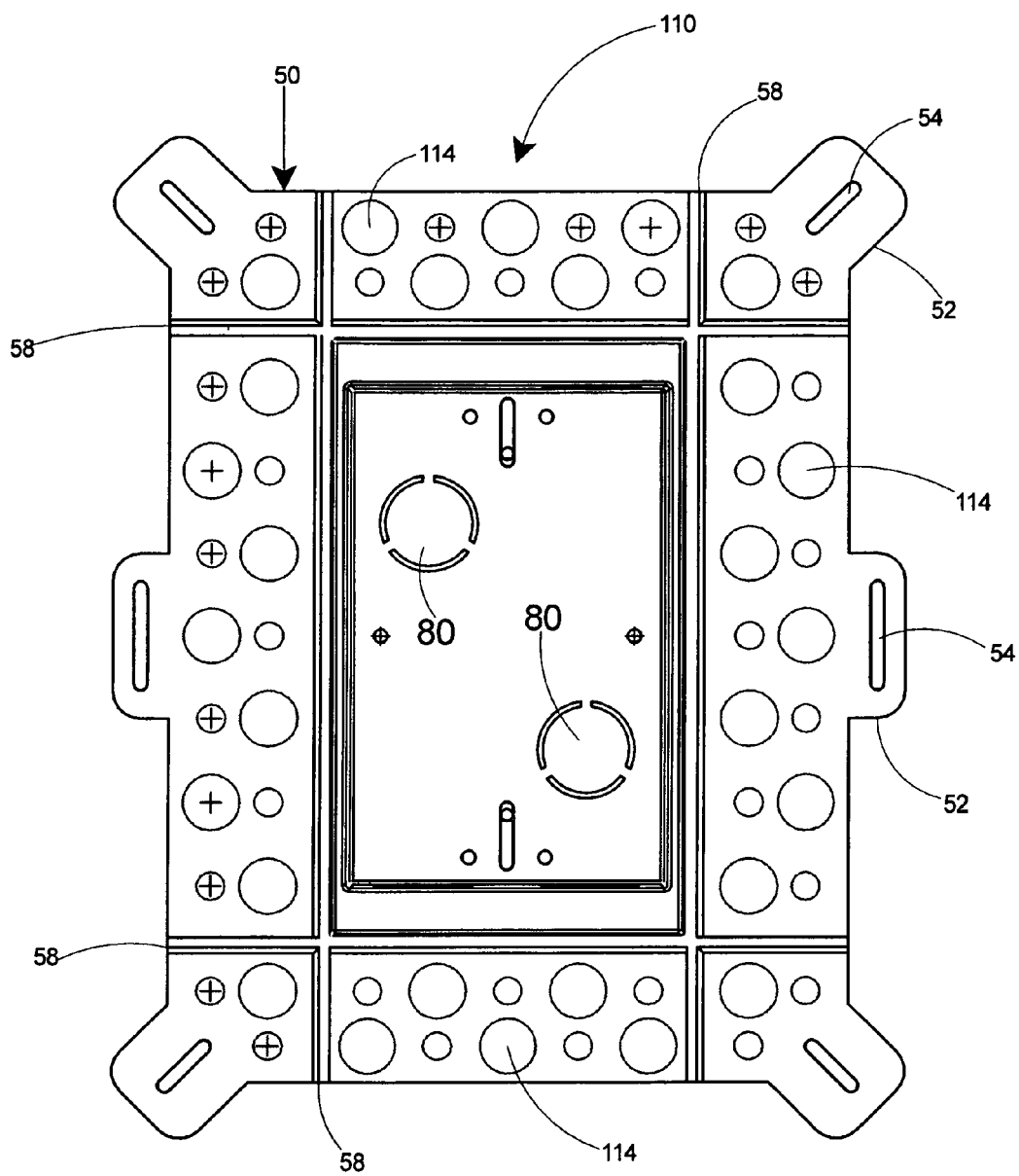
FIG. 10 is a back view of the electrical box of FIG. 8.

Referring to FIGS. 8-10, there is shown a third embodiment 110 of a recessed electrical box according to the present invention. The third embodiment of the recessed electrical box 110 is for use on a new building that is to be finished with a stucco layer 112. Electrical box 110 includes a removable inner flange 46 but no outer flange. As shown in FIG. 9, on an unfinished building, the box 110 is simply pushed into an appropriately sized hole 102 that has been cut in the substrate 106. There is no need for an outer flange, as a stucco layer will later be applied over the inner flange 46.

All of the embodiments of the recessed electrical box as presented herein are preferably integrally formed in one piece. Therefore the first box 22, the second box 38, and the flange or flanges, including the inner flange 46 and the outer flange 48, are integrally molded in one piece. The recessed electrical box is preferably formed by injection molding of plastic. The plastic used to form the recessed electrical box is preferably polyvinyl chloride, polyethylene, or polypropylene. Alternatively, the electrical box may be formed of metal. The first box 22 and second box 38 may be formed of metal in one piece or the boxes 22, 38 formed separately of metal and secured together by conventional means such as screws and nuts to form the electrical box of the present invention.

The recessed electrical box of the present invention simplifies the installation of electrical devices on all types of finished exteriors, including siding or stucco. It is adaptable to being installed on an unfinished wall or as a retrofit on an existing finished wall. Operation of the recessed electrical box is accomplished by first determining whether it will be used in new construction, in which the building substrate is installed but not the siding or other finish layer, or it will be used on an existing building.

Figure 2B:
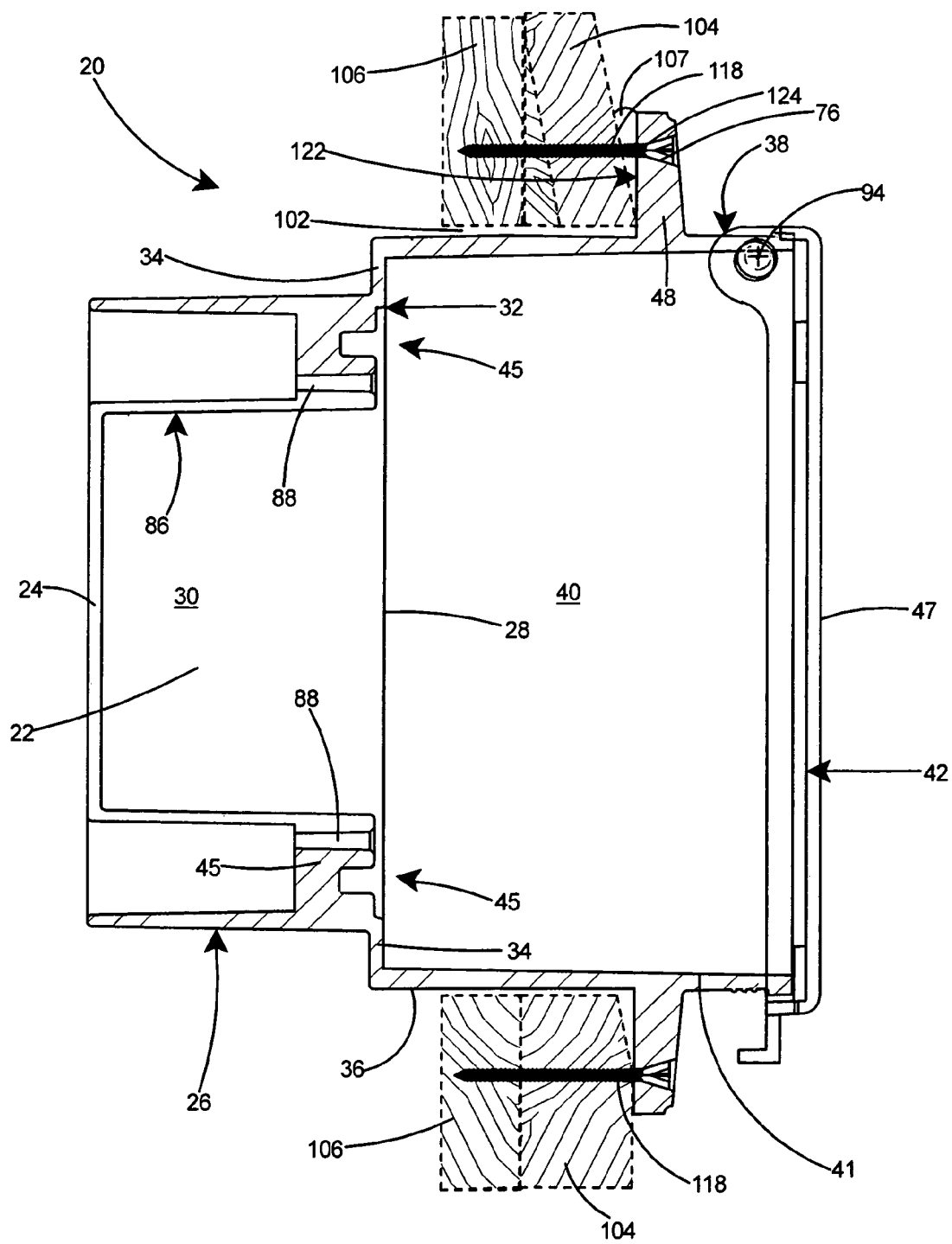
FIG. 2B is a sectional view of the recessed electrical box taken along line 2-2 of FIG. 1 and shown mounted to the siding of an existing building.

The reader is referred to FIG. 2A for an understanding of the installation procedure for the recessed electrical box on a building under construction and to FIG. 2B for an understanding of the installation procedure for the recessed electrical box on an existing building. If the building is under construction, with the substrate installed but no finished layer, the recessed electrical box is installed by first cutting an appropriately sized and shaped hole 102 in the substrate to accept the electrical box, as shown in FIG. 2A. The recessed electrical box 20 is then inserted into the hole 102 until the back surface 56 of the inner flange 46 is flush against the substrate 106. Fasteners 118 are then inserted through the slots 54 and tightened to secure the electrical box 20 to the substrate. Installing siding 104 on the substrate 106 then finishes the exterior of the building. The ends of the siding are placed flush with the second peripheral sidewalls 36 in the gap 97. Caulking 107 is then applied at the juncture of the electrical box 20 with the siding 104 to seal against rain and the elements.

With reference to FIG. 2B, if the building is an existing building, with both the siding and substrate installed, this is termed a "retrofit" of an electrical box to an existing building. In this situation, the recessed electrical box 20 is installed by first cutting an appropriately sized and shaped hole 102 in both the substrate 106 and the outer covering 104, which may be siding, stucco, or any other conventional outer covering material, to accept the electrical box 20. If the building is an existing building, the inner flange 46 is removed by cutting along the grooves 58 (see FIG. 4) that are adjacent the outer periphery 68 of the second box 38. With the inner flange 46 removed, the electrical box 20 is inserted into the hole 102 until the back surface 122 of the outer flange 48 is flush against the siding 104. Holes 120 are then drilled in the outer flange 48 and fasteners 118 inserted therethrough. Alternatively, the holes 120 can be preformed in the outer flange 48. The fasteners 118 are then tightened into the siding 104 and the substrate 106 to secure the recessed electrical box 20 to the siding and the substrate. Caulking 107 is then applied at the juncture of the electrical box 20 with the siding 104 to seal against rain and the elements.

Figure 6:
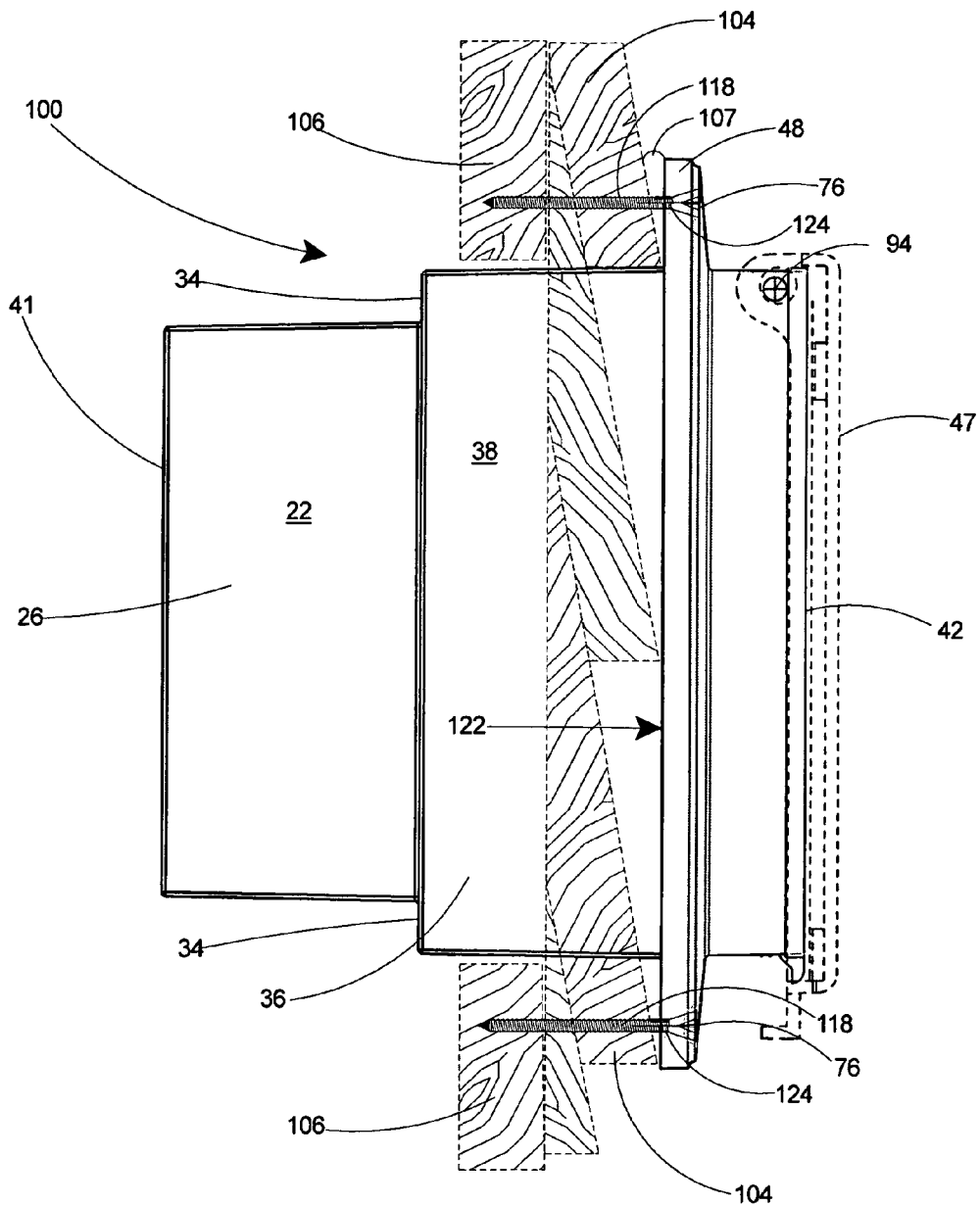
FIG. 6 is a side view of the recessed electrical box taken along line 6-6 of FIG. 5.
Figure 7:
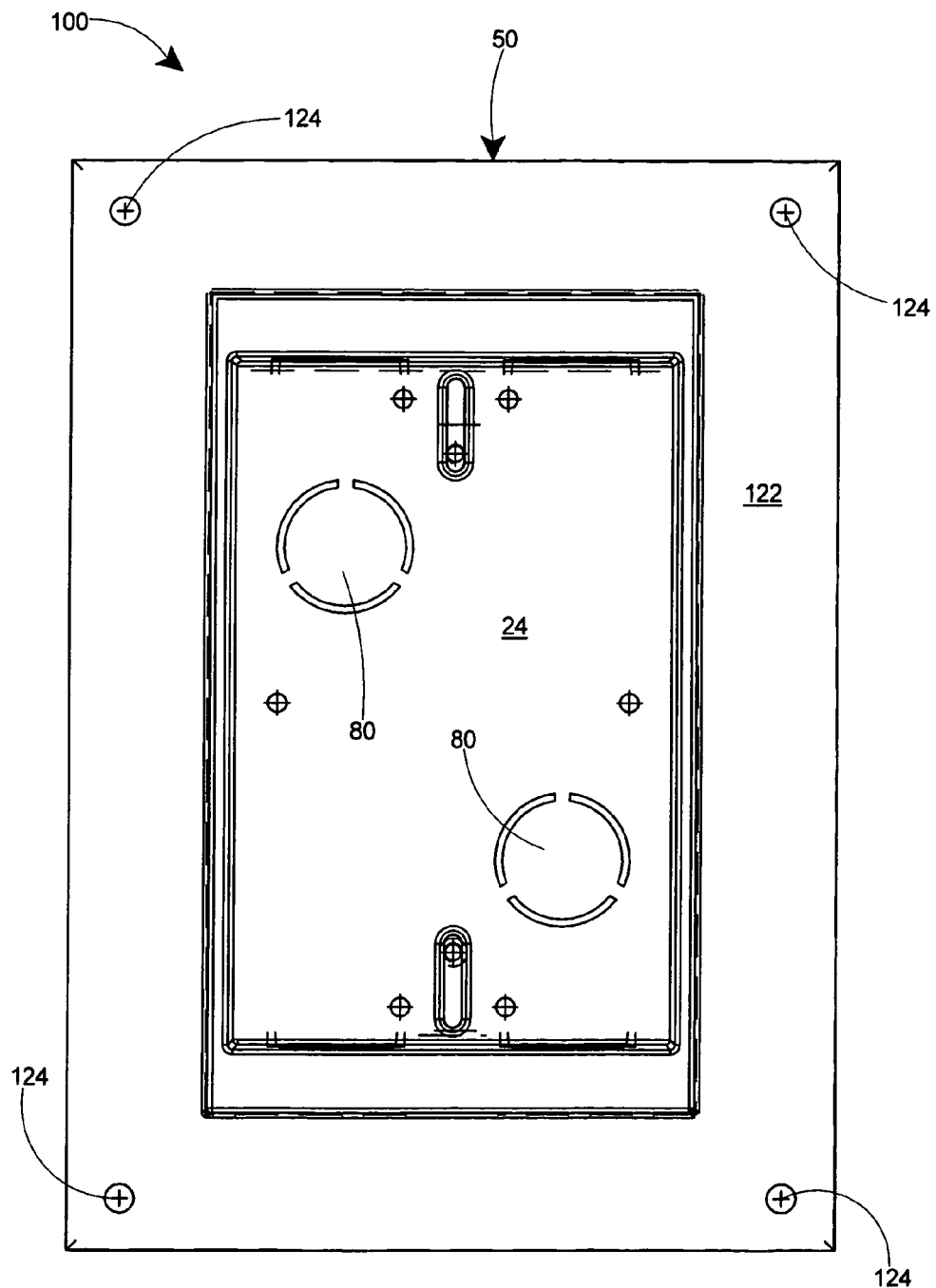
FIG. 7 is back view of the electrical box of FIG. 5.

The second embodiment of the recessed electrical box 100, shown in FIG. 6, simplifies installation of an electrical box on an existing building having any type of outer covering, including siding, stucco, or masonry. As shown in FIG. 6, both the substrate 106 and the siding 104 are installed. As the second embodiment 100 includes an outer flange 48 but no inner flange, the installer is saved the extra effort of having to remove an unneeded flange. To operate the second embodiment of the recessed electrical box 100, the installer cuts an appropriately sized and shaped hole 102 in the siding 104 and substrate 106. The recessed electrical box 100 is then inserted into the hole 102 until the back surface 122 of the outer flange 48 is flush against the siding 104. In the second embodiment of the recessed electrical box 100, holes 124 are included in the outer flange 48. The fasteners 118 are then are then inserted through the holes 124 and tightened into the siding 104 and the substrate 106 to secure the recessed electrical box 100 to the siding and the substrate. Caulking 107 is then applied in the same manner as for the first embodiment. Although FIG. 6 depicts a retrofit on a building having siding for an outer wall covering, the same procedure can be followed to install a retrofit on a building having an outer wall covering of stucco or masonry.

As described above, the third embodiment of the recessed electrical box 110 is for use on a building under construction that will be finished with a stucco layer 112. With reference to FIG. 9, electrical box 110 includes a removable inner flange 46 but no outer flange. To install the third embodiment 110 on a building under construction, the box 110 is simply pushed into an appropriately sized hole 102 that has been cut in the substrate 106. Fasteners 118 are then placed through the slots 54 in the ears 52 of the inner flange 46 and tightened into the substrate 106. There is no need for an outer flange, as a stucco layer will later be applied over the inner flange 46 and no unsightly gap will exist between the stucco and the electrical box. The inner flange 46, as shown in FIG. 10, includes a plurality of holes 114 that allow stucco to flow through the inner flange 46 and thereby form a better adhesion to the inner flange 46 and to the substrate 106.

Figure 15:
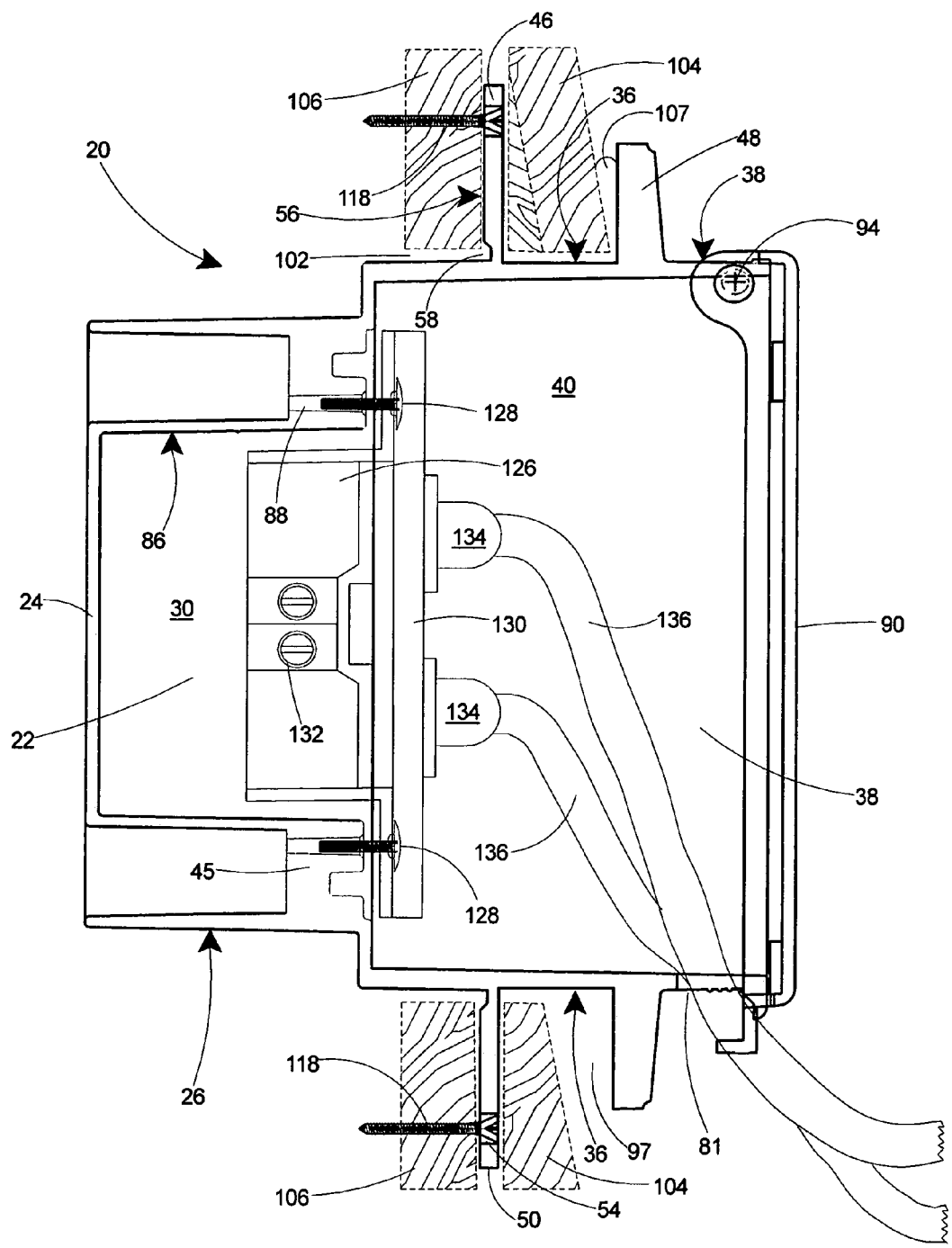
FIG. 15 is a sectional view of the recessed electrical box of FIG. 1 shown with a duplex receptacle installed therein and secured to an unfinished exterior wall.

FIG. 15 depicts installation of the first embodiment of the recessed electrical box 20 on a building under construction having an unfinished wall or substrate 106. For installation on the building under construction, a hole is made in the substrate 106 and the recessed box 20 is inserted until the inner flange 46 contacts the substrate 106. To secure the electrical box 20 to the building, fasteners 118 are driven through the slots 54 provided in the inner flange 46 and into the substrate 106. The finish layer 104, consisting of lapped siding or any appropriate siding material, is installed within the gap 97 and placed snug against the second peripheral sidewalls 36. A duplex outlet 126 or other electrical device is then secured therein by device fasteners 128. A face plate 130 is fastened to the electrical device or duplex outlet 126 to close the first box 22 and thereby seal the first enclosure 30 to protect the terminals 132 of the duplex outlet 126 and any wiring therein. The plug ends 134 of two electrical cords 136 are shown plugged into the duplex outlet 126 and run from the outlet 126 through the second enclosure 40 of the recessed electrical box 20 and through the circular cord openings 81 in the electrical box.

Figure 16:
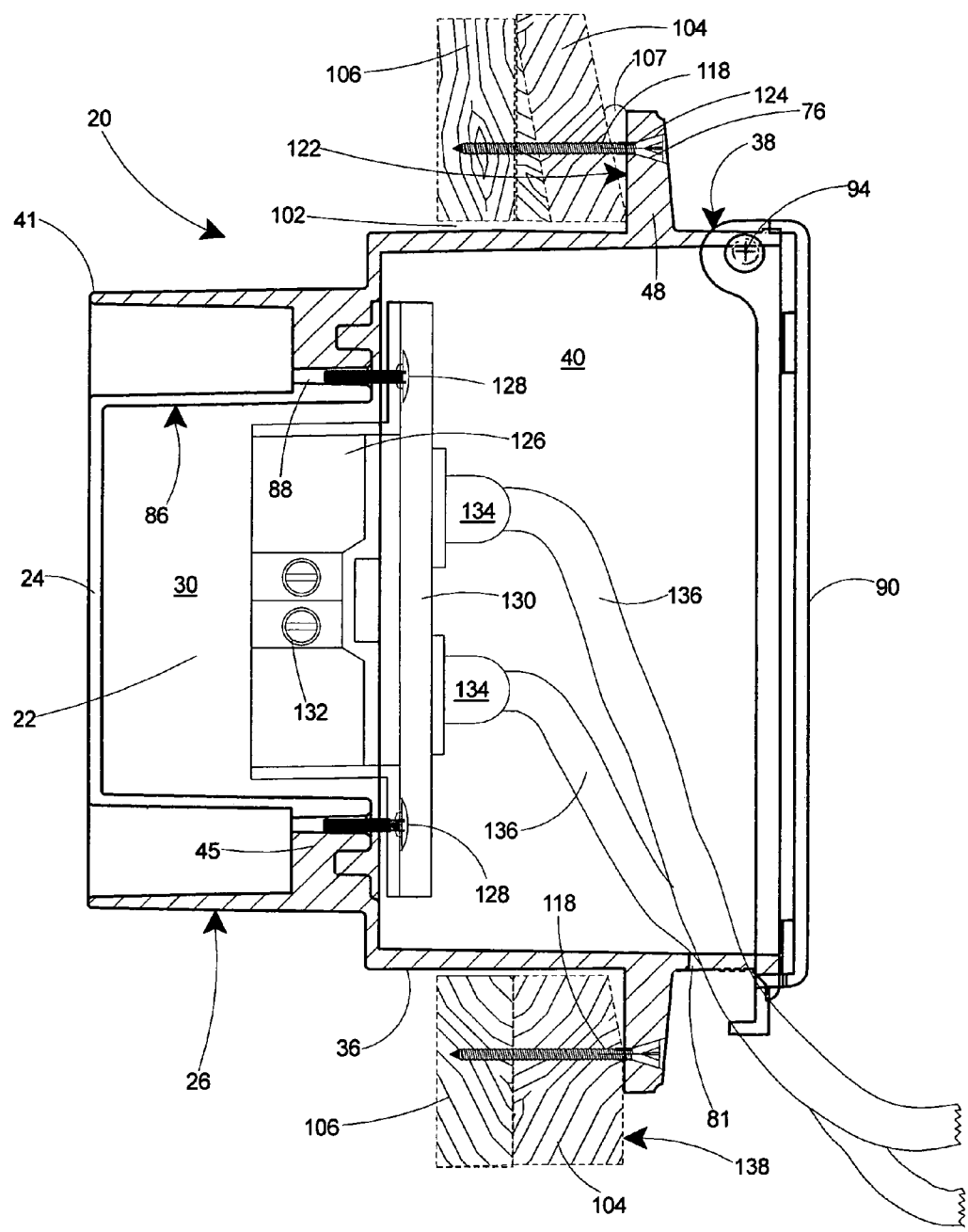
FIG. 16 is a sectional view of the recessed electrical box of FIG. 1 shown with a duplex receptacle installed therein and secured to a finished exterior wall.

FIG. 16 depicts installation of the first embodiment of the recessed electrical box 20 on a finished wall or siding 104. For installation on a finished wall 104, the inner flange is removed and a hole 102 cut in the siding 104 or other finish layer to a size large enough to accommodate the outer periphery of the second peripheral sidewalls 36. The outer periphery of the outer flange 48 can be provided with apertures 76 to accommodate fasteners 118. The electrical box 20, with the inner flange removed, is fitted into the hole 102 and pushed therein until the outer flange 48 is flush with the outer surface of the siding 104. Fasteners 118 are inserted therein through apertures 76 to secure the recessed electrical box 20 to the siding 104 and substrate 106 and thereby to the building. As illustrated in FIG. 16, the recessed outlet box 20 recesses the electrical device 126 well behind the outside surface 138 of the building and protects it from impacts. With the recessed electrical box 20 secured to the outside surface 138 and caulking 107 applied between the outer surface 138 and the box 20, the box member 41 and cover member 47 provide a rainproof electrical box. With the cover 47 closed, rain is prevented from entering the box member 41. When the cover member 47 is open, the box member 41 easily sheds any water that enters the box, as the second enclosure 40 is larger than the first enclosure 30, and the water will run out of the circular cord openings 81. The large second enclosure 40 and circular cord openings 81 insure that water will run out and not build up to a level that will contact the electrical device 126 or the wiring therein.

Figure 17:
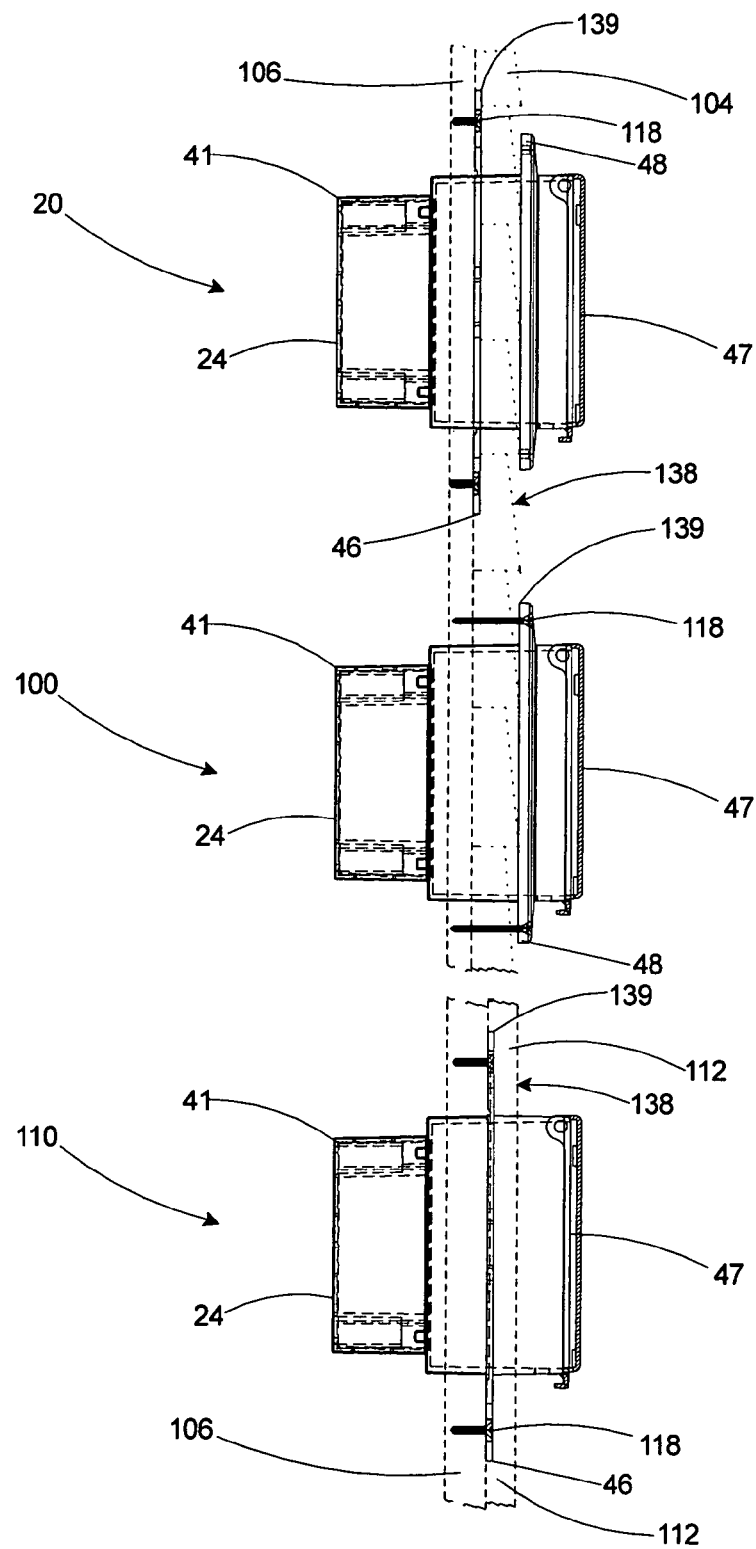
FIG. 17 is a conceptual view depicting the first and second embodiments of the recessed outlet box installed on a wall portion finished with siding and depicting the third embodiment of the recessed outlet box installed on a wall portion finished with stucco.

Referring to FIG. 17, the three embodiments of the recessed electrical box 20, 100, and 110 are shown installed on the outside surface 138 of a building. The flanges 46, 48 serve as a positioning arrangement 139 for positioning the electrical box 20, 100, 110 at the correct depth with respect to the wall. For the first embodiment of the recessed electrical box 20, shown at the top of the figure, either the inner 46 or outer 48 flange serves as the positioning arrangement, depending on the application. If the siding 104 has not been installed, the installer simply makes a hole in the substrate 106 and pushes the box 20 into the hole until the rear surface of the inner flange 46 contacts the outer surface 140 of the substrate 106. Fasteners 118 are then driven through the inner flange 46 to secure the recessed electrical box 20 to the substrate 106. Siding 104 is then inserted into the gap 97 surrounding all four sides of the electrical box 20 and the siding 104 is then fastened to the substrate 106.

Alternately, if it is a retrofit situation, the inner flange 46 of recessed outlet box 20 can be broken or cut away at the grooves 58 shown in FIG. 3. The outer flange 48 then serves as a positioning arrangement to achieve the proper depth of mounting of the electrical box 20. A hole is made in the substrate 106 and siding 104, and the electrical box 20 is pushed into the hole until the back surface of the outer flange 48 contacts the siding 104. Fasteners 118 are then driven through the outer flange 48 and into the substrate 106 to secure the electrical box 20 to the outside surface 138 of the building. The resultant secured and anchored electrical box 20 is shown in the middle of FIG. 17. Reference numeral 100 is also shown in FIG. 17 referring to the middle electrical box as the second embodiment of the electrical box described herein is identical to the first embodiment except that no inner flange is included thereon. Therefore, in a retrofit application, the second embodiment of the recessed electrical box 100 is installed in the same manner as the first embodiment except there is no need to break off an inner flange.

The third embodiment of the recessed electrical box 110, shown at the bottom of FIG. 17, includes only a breakaway inner flange 46. If the building is under construction and the substrate 106 exposed, the inner flange 46 serves as a positioning arrangement for mounting the electrical box 110 at the proper depth. Fasteners 118 can then be driven through the inner flange 46 of the recessed electrical box 110 to secure it to the substrate 106.

Regardless of which embodiment of the recessed electrical box 20, 100, 110 is used, the electrical device will be positioned substantially behind the outside surface 138 of the building, thereby providing a great deal of protection to the electrical device. As shown in FIG. 4, the planar front edge 42 of the recessed electrical box 20 further includes one or more U-shaped slots 142 in the side walls 36 of the second box 38. As shown in FIG. 13, the cover member 47 also includes one or more U-shaped slots 144 in the stiffening side wall 95. When the cover member 47 is pivotally connected to the box member 41 and the cover member 47 is closed upon the box member 41, as shown in FIG. 18, the second box 38 mates the U-shaped slots 142 of the second box 38 with the U-shaped slots 144 of the cover member 47 thereby providing a substantially circular cord opening 81 therein. The circular cord openings 81 thereby form a passageway for electrical cords. When the recessed outlet box of the present invention is mounted on a building with the cord openings 81 oriented downward vertically, the recessed outlet box creates a rainproof electrical box that effectively shields the electrical device from rainfall.

With reference to FIG. 1, the securement arrangement for securing an electrical device (not shown) to the recessed electrical box 20 includes a top boss 146 integral with the side wall 26 of the first box 22 and a bottom boss 148 integral with the side wall 26 of the first box 22. Bores 88 are included in each boss 146, 148 and may be smooth bores or threaded bores.

Figure 19:
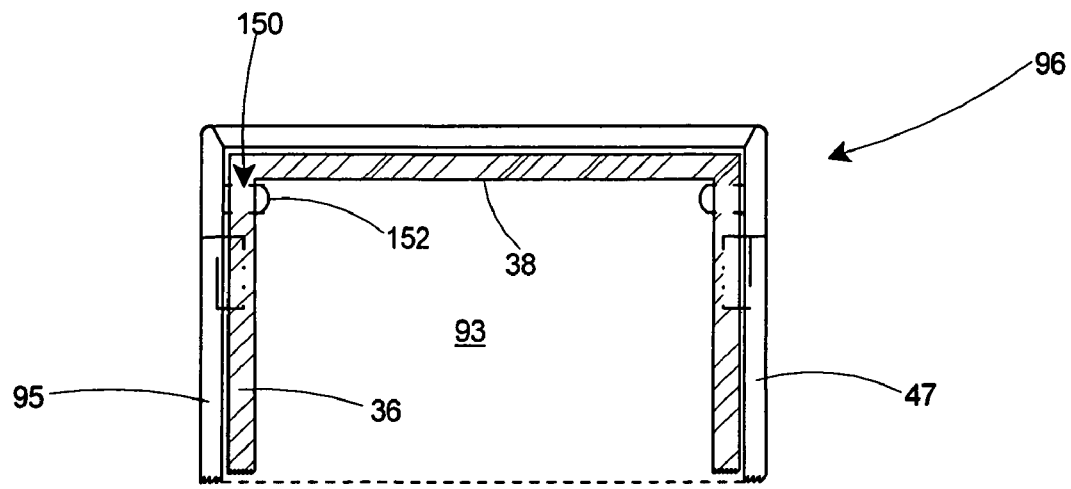
FIG. 19 is a sectional view of a top portion of the sidewalls of the second box and the cover member taken along line 19-19 of FIG. 9 and depicting an alternate cover arrangement for the recessed electrical box.

Referring to FIG. 19, an alternate cover arrangement 96 is shown for pivotally connecting the cover member 47 to the sidewalls 36 of the second box 38. The alternate cover arrangement 96 includes apertures 150 in the sidewalls 36 of the second box 38 and inward-extending posts 152 on the cover member 47. The inward-extending posts 152 extend through the apertures 150 in the sidewalls 36 of the second box 38 thereby pivotally connecting the cover member 47 to the second box 38.

Figure 20:
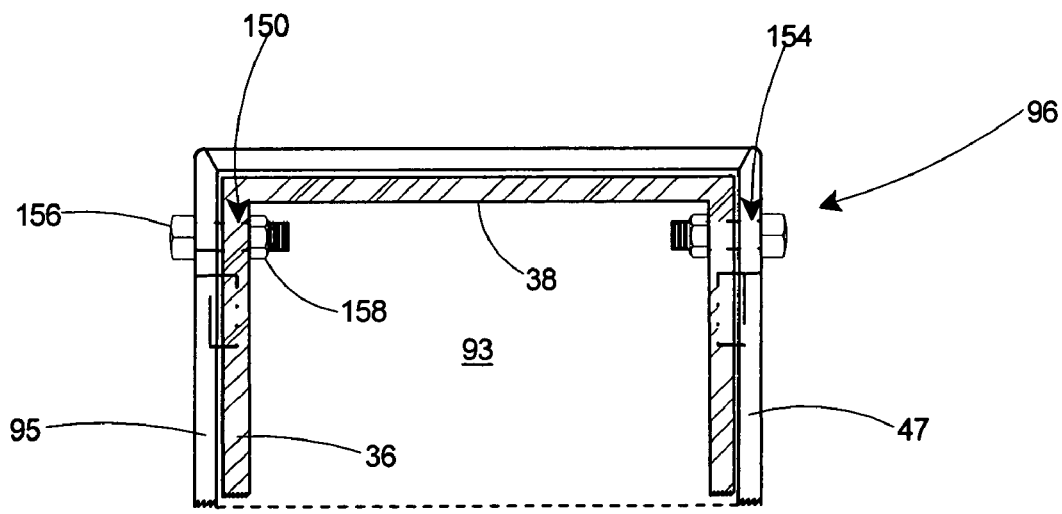
FIG. 20 is a sectional view similar to FIG. 19 but showing a second alternate cover arrangement for the recessed electrical box of the present invention.

With reference to FIG. 20, a second alternate cover arrangement 96 for pivotally connecting the cover member 47 to the sidewalls 36 of the second box 38 includes apertures 150 in the sidewalls 36 of the second box 38, apertures 154 in the cover member 47, and a bolt 156 disposed through the apertures 150, 154. A nut 158 secures the bolt 156 within the apertures 150, 154 thereby pivotally connecting the second box 38 to the cover member 47.

Figure 21:
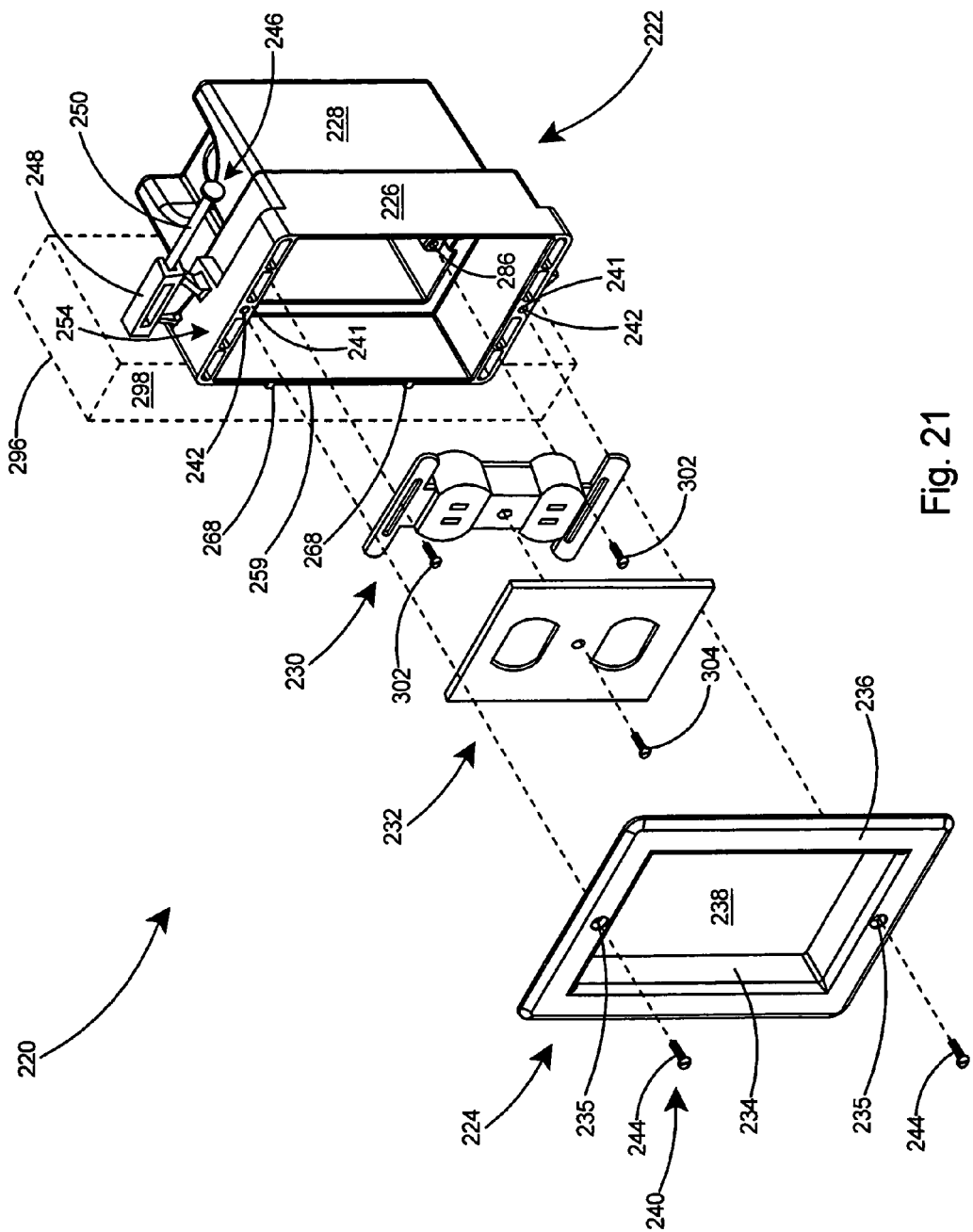
FIG. 21 is an exploded perspective view of a fourth embodiment of the recessed electrical outlet assembly according to the present invention along with a duplex outlet and its complementary faceplate.

With reference to FIG. 21, a fourth and preferred embodiment is shown of the present invention, which is a recessed electrical outlet assembly 220 including an electrical box 222 and a frame member 224. The electrical box 222 includes a front sidewall portion 226 and a rear sidewall portion 228, with the front sidewall portion 226 being of larger width and height than the rear sidewall portion 228. In FIG. 21, a duplex receptacle 230 and a faceplate 232 are shown in alignment with the electrical box 222. The frame member 224 includes a peripheral sidewall 234 and a lateral flange 236 with the peripheral sidewall 234 terminating in an open rear end 238. A fastening arrangement 240 for securing the frame member 224 to the electrical box 222 includes apertures 235 in the flange 236 of the frame member 224, a boss 241 including a bore 242 therein in the front sidewall 226 of the electrical box 222, and a fastener 244 for securing through the apertures 235 of the frame member 224 into the bore 242 of the electrical box 222.

Figure 22:
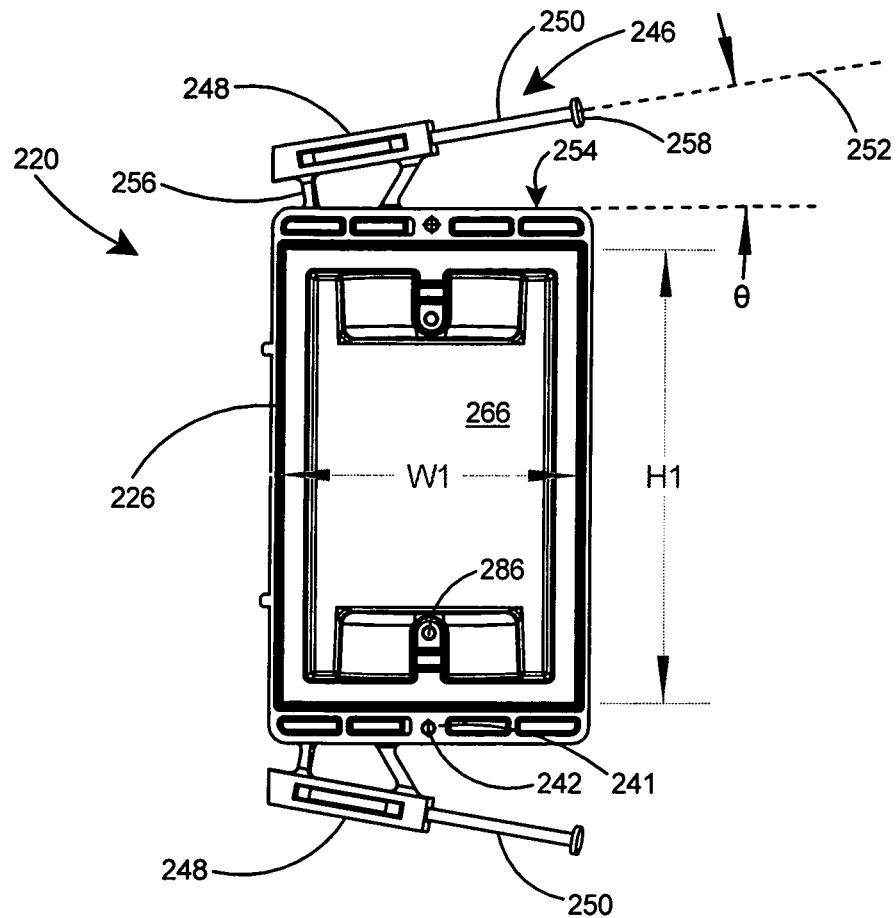
FIG. 22 is a front view of the electrical box portion of the recessed electrical outlet assembly of FIG. 21.

As shown in FIG. 22, the electrical box portion 222 of the recessed electrical outlet assembly includes a mounting arrangement 246 for securing the electrical box to a stud (not shown). The mounting arrangement 246 includes bosses 248 integral with the front sidewall 226 of the electrical box 222 and a captive fastener 250 held frictionally within each of the bosses 248. As shown by axis 252, the axial orientation angles each captive fastener 250 away from the outer surface 254 of the front sidewall 226 by angle θ. Integral legs 256 offset each boss 248 from the outer surface 254 of front sidewall 226 and the axial orientation directs the head 258 of the captive fastener 250 away from the front sidewall 226 to render the captive fastener 250 easily reachable by an installer.

Figure 23:
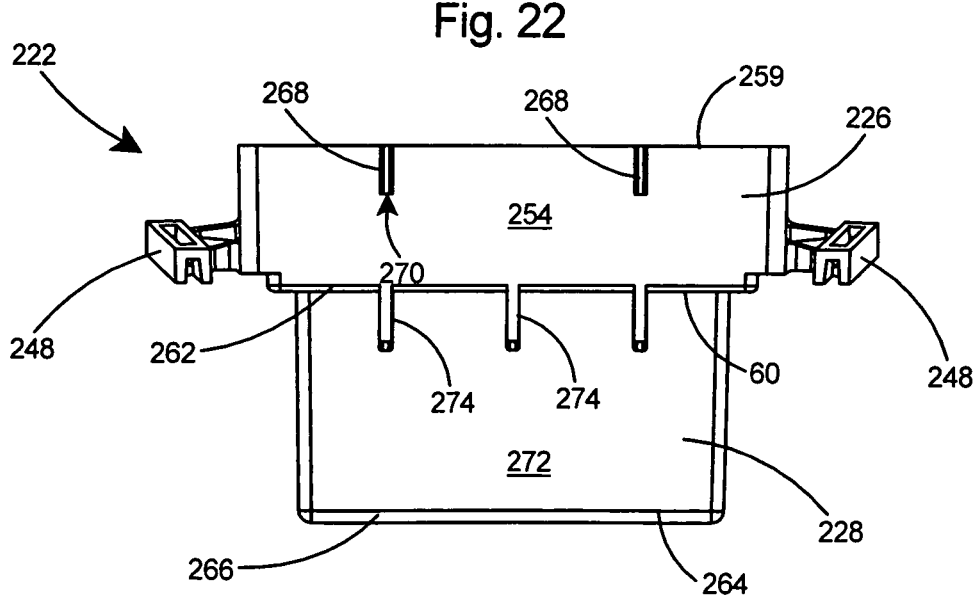
FIG. 23 is a side view of the electrical box as viewed from the left side of FIG. 22.

Referring to FIG. 23, the front sidewalls 226 of the electrical box 222 include a front edge 259 and a rear edge 260. A lateral wall 262 extends inward from the rear edge 260 of the front sidewalls 226. The rear sidewalls 228 extending rearward from the lateral wall 262 to a rear edge 264 and a rear wall 266 extends from the rear edge 260 thereby closing the rear end of the electrical box 222.

As shown in FIG. 23, the electrical box 222 includes one or more alignment tabs 268 extending along the outer surface 254 of the front sidewalls 226. The alignment tabs 268 extend rearward from the front edge 259 of the electrical box 222. The alignment tabs 268 include rear edges 270 which are planar with the front edge 259 of the electrical box 222. The rear sidewalls 228 include an outer surface 272 and one or more ribs 274 extending along the outer surface 272. The ribs 274 extend rearward from the lateral wall 262 of the electrical box 222.

Figure 24:
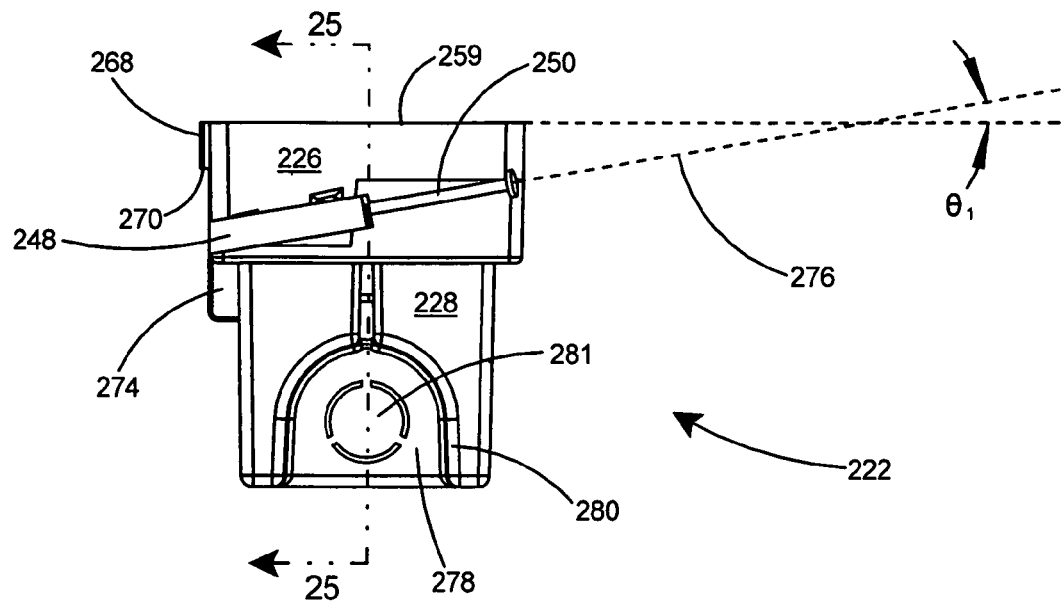
FIG. 24 is an end view of the electrical box as viewed from the bottom end of FIG. 22.

With reference to FIG. 24, as shown by axis 276, the captive fasteners 250 are at an angle $\theta_1$ of between 5 and 15 degrees with respect to the front edge 259 of the electrical box 222. The ribs 274 extend along the rear sidewall portion 228 and provide an extended surface area for fitting flush against a stud (not shown) that the electrical box 222 will later be secured to. As shown in FIG. 24, the rear sidewalls 228 of the electrical box 222 include one or more recessed areas 278 therein, with each recessed area 278 including a recessed peripheral wall 280 therein. The recessed area 278 includes a knockout 281 or removable wall portion, which can be removed to allow insertion of an electrical fitting therein or passage of electrical cables (not shown) to the electrical box.

Figure 25:
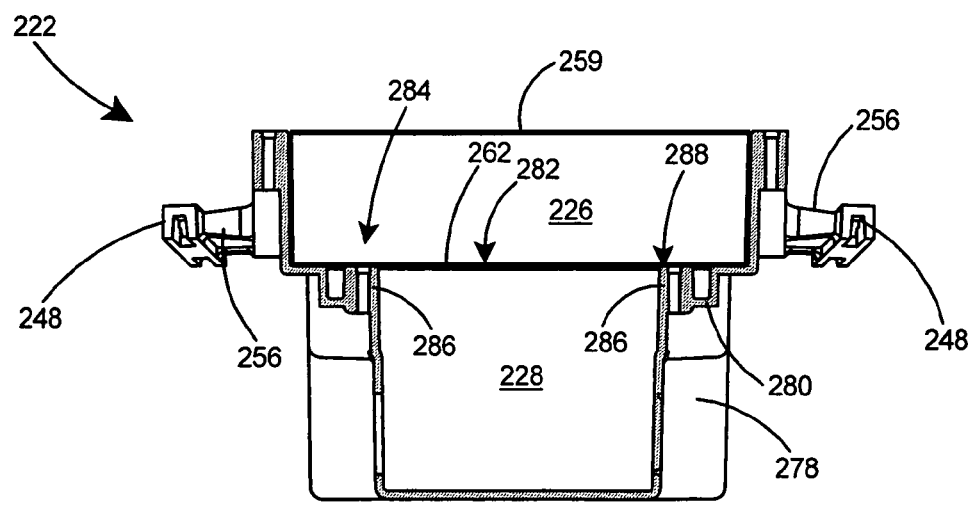
FIG. 25 is a sectional view of the electrical box taken along line 25-25 of FIG. 24.

With reference to FIG. 25, the lateral wall 262 of the electrical box 222 includes a front face 282 and an arrangement 284 for securing an electrical device (not shown) to the electrical box 222 such that it is mounted planar with the front face 282 of the lateral wall 262. The arrangement 284 for securing an electrical device includes device mounting bosses 286 molded integrally within the electrical box 222. The device mounting bosses 286 terminate in a front face 288 that is planar with the front face 282 of the lateral wall 262.

Figure 26:
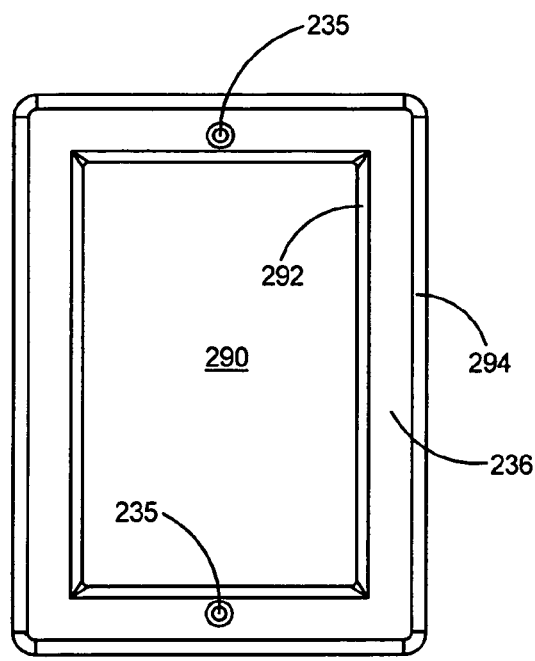
FIG. 26 is a front view of a frame member that forms a portion of the recessed electrical outlet assembly of FIG. 21.
Figure 27:
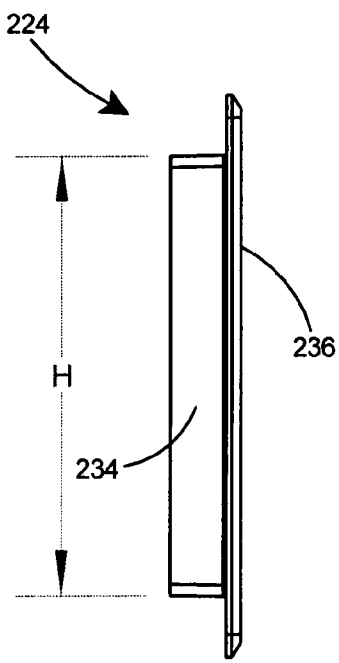
FIG. 27 is a side view of the frame member as viewed from the left side of FIG. 25.
Figure 28:
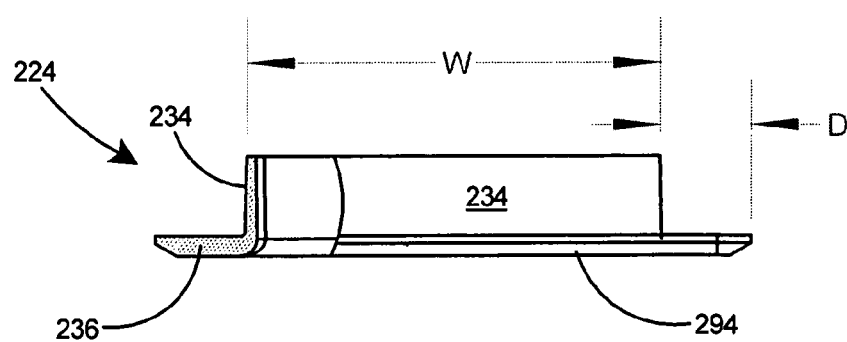
FIG. 28 is an end view of the electrical box as viewed from the bottom end of FIG. 25 and with a portion of the frame member cut away to show a sectional view of a collar portion.
Figure 29:
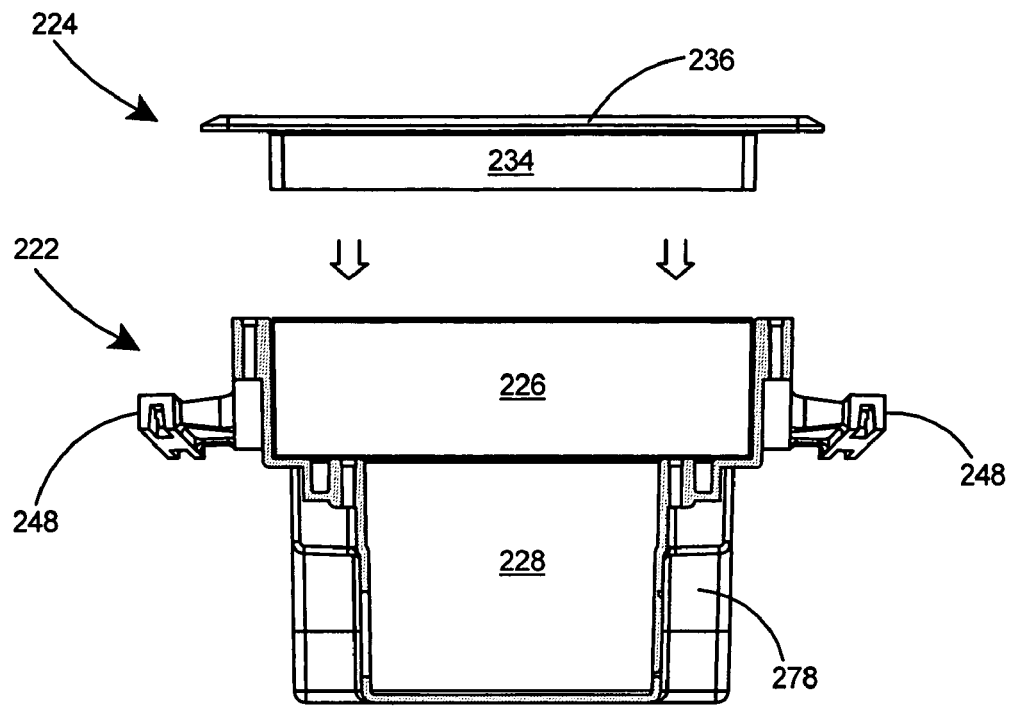
FIG. 29 is an exploded side view of the frame member portion in alignment with a sectional side view of the electrical box portion to which it will be secured to form a recessed electrical outlet assembly according to the present invention.
Figure 30:
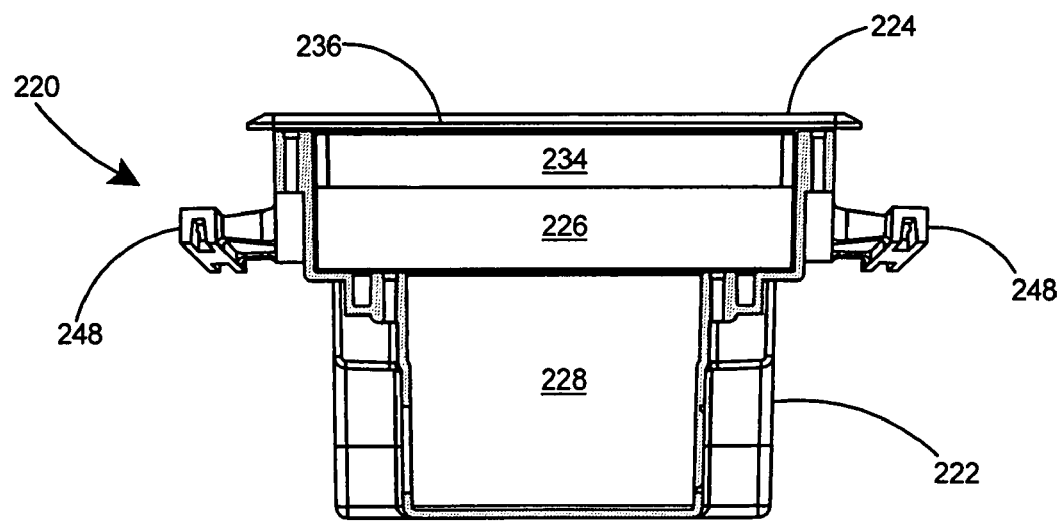
FIG. 30 is the side view of FIG. 29 but with the frame member secured to the electrical box to form the recessed electrical outlet assembly of the present invention.

Referring to FIGS. 26-28, the flange 236 of the frame member 224 extends outward from the peripheral sidewall 234 of the frame member 224 by a distance D of at least 0.5 inch. The frame member 224 includes a central opening 290, an inner chamfered edge 292 at the juncture of the peripheral sidewall 234 and the flange 236, and an outer chamfered edge 294 around the outer periphery of the flange 236. The outer width W across the peripheral sidewall 234 of the frame member 224, as shown in FIG. 28, and the outer height H across the peripheral sidewall 234 of the frame member 224, as shown in FIG. 27, are slightly smaller than the inner width W1 and inner height H1 (see FIG. 222) of the front sidewall portion 226 of the electrical box 222 to enable the peripheral sidewall 234 of the frame member 224 to be telescopically received within the front sidewall portion 226 of the electrical box 222, as shown in FIGS. 29 and 30.

Figure 31:
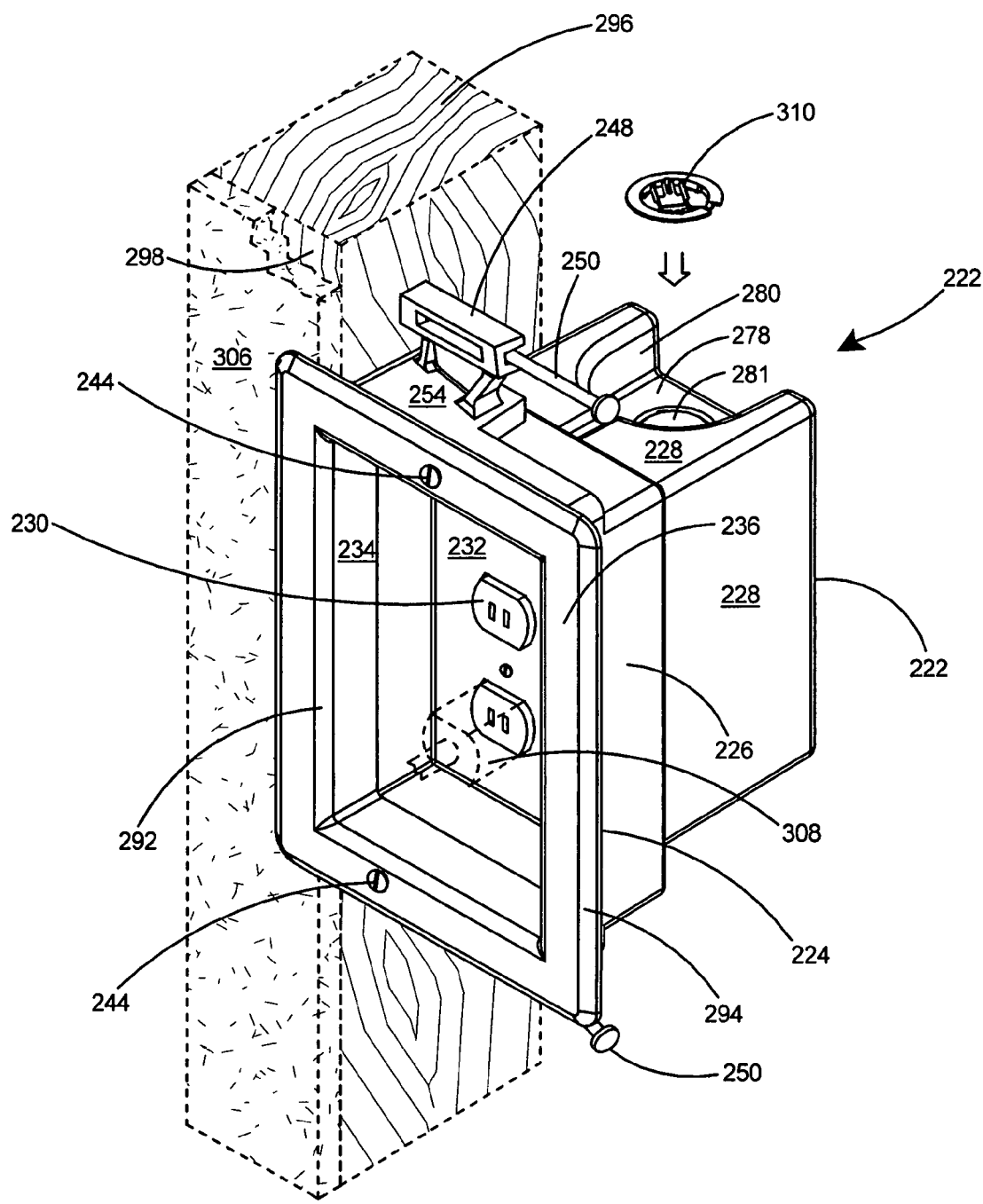
FIG. 31 is a perspective view of the recessed electrical outlet assembly of the present invention secured to a wall stud and with a duplex outlet and its complementary faceplate installed therein.

Reference is made to FIGS. 21 and 31 for an understanding of the operation of the recessed electrical outlet assembly 220 of the present invention. The recessed electrical outlet assembly 220 is used for recessing an electrical device, such as a duplex receptacle, within the wall of a structure. In certain locations, such as behind a cabinet which requires a wall outlet for illuminating a light, it would be advantageous to recess the electrical outlet so that the plug ends of the electrical cord at the outlet does not interfere with placing the cabinet against the wall. The description for operation of the recessed electrical outlet assembly presented herein is for interior use in new construction, in which the wall studs are exposed and prior to securing sheet rock to the wall. As shown in FIG. 21, the electrical box 222 is placed against a wall stud 296 and aligned with the front face 298 of the stud by sliding the box 222 backwards until the rear edge 270 of the alignment tabs 268 (see FIG. 24) are flush against the front face 298 of the stud 296. The alignment tabs 268 align the front edge 259 of the electrical box 0.5 inch from the face 298 of the stud 296, which is the proper distance to align the front edge 259 of the box 222 with the eventual surface of the wall for conventional ½-inch thick sheetrock.

With reference to FIG. 31, after the box 222 is aligned properly with the stud 296 by the alignment tabs 268, the captive fasteners 250 within the bosses 248 of the mounting arrangement 246 are driven into the wall stud 296 thereby securing the electrical box 222 to the stud 296. The captive fasteners 250 are easily accessible by the installer as a result of their offset from the outer surface 254 of the front sidewall 226 and the axial orientation of the captive fasteners 250 with the head of the fastener 250 oriented toward the front of the electrical box 222 and outward from the front sidewall 226.

After the electrical box 222 is secured to the wall stud 296, see FIG. 21, an electrical device such as the duplex receptacle 230 shown in FIG. 21 can be secured to the electrical box 222 by fasteners 302 secured into the device mounting bosses 286 within the box 222. A faceplate 232 can then be secured to the duplex receptacle 230 by a fastener 304 as shown in FIG. 21. Frame member 224 is then secured to the electrical box 222 by driving the fasteners 244 of the fastening arrangement 240 through the apertures 235 in the flange 236 of the frame member 224 and into the bores 242 that are integral with the front sidewalls 226 of the electrical box 222.

With reference to FIG. 31, after the frame member 224 is secured to the electrical box 222, flange 236 of the frame member 224 is secured flush against the front edge 259 of the electrical box 222 and also flush with the wall or outer face of the sheetrock 306. After the sheetrock 306 is installed, the recessed electrical outlet assembly 220 provides an electrical device 230 that is recessed a substantial distance from the face of the wall, thereby providing plenty of space to accommodate the plug ends 308 of electrical cords and thus preventing them from interfering with placement of the cabinet, electrical appliance, or similar object.

Although a specific example is described herein for the installation of the recessed electrical outlet assembly on an interior wall that has been newly constructed, it should be emphasized that the recessed electrical outlet assembly also could be used on exterior walls or on old work interior walls. For existing interior walls, a hole would be cut in the wall adjacent to a wall stud. Although the captive fasteners shown herein are nails, they could also be screws that would be more easily driven into the wall stud in an old work application.

As shown in FIG. 31, the recessed area 278 in the rear sidewall portion 228 enables the use of electrical fittings or connectors such as the Black Button™ push-in connector 310 for connecting non-metallic cable to electrical boxes, which is available from Arlington Industries of Scranton, Pa. The recessed area 278 permits use of the connectors without projecting from the sidewall and interfering with placement of the electrical box in locations where space is tightly restricted.

The electrical box 222 and frame member 224 portions of the recessed electrical outlet assembly of the present invention may be constructed of metal or plastic. In an especially preferred embodiment, the electrical box 222 and frame member 224 are each molded in one piece of plastic.

Having thus described the invention with reference to a preferred embodiment, it is to be understood that the invention is not so limited by the description herein but is defined as follows by the appended claims.

What is claimed is:

1. A one-piece electrical box for recessing an electrical device within a wall comprising:
   a first box including an inner cavity having peripheral side walls for receiving the electrical device and a front opening;
   said peripheral side walls including a front edge;
   a transverse wall portion extending laterally from said front edge of said first box;
   an outer box including peripheral side walls extending outward from said transverse wall portion of said inner cavity to a front edge and adapted to be recessed at least in part into the wall and provide an outer enclosure;
   at least one flange extending outwardly from said peripheral side walls of said outer box;
   a front opening at said front edge of said outer box for enabling access to said front opening of said inner cavity;
   a mounting arrangement adapted to receive the electrical device within said front opening in said inner cavity; and
   a cover pivotally attached to said outer box.

2. The electrical box of claim 1 wherein said peripheral side walls of said first box are smaller than said peripheral side walls of said outer box.

3. The electrical box of claim 1 including
   an inner flange extending outward laterally from said peripheral side walls of said outer box; and
   said inner flange positioned between said flange and said transverse wall portion.

4. The electrical box of claim 1 wherein
   said electrical box is molded; and
   said flange is molded as one piece with the remainder of said electrical box.

5. The electrical box of claim 1 wherein at least one part of said mounting arrangement is molded with said inner cavity.

6. The electrical box of claim 1 wherein said transverse wall portion forms a partial back wall of said outer box.

7. The recessed electrical box of claim 1 wherein said mounting arrangement includes
   a top boss integral with said peripheral side wall of said first box;
   a bottom boss integral with said peripheral side wall of said first box; and
   bores in each of said bosses.

8. The recessed electrical box of claim 1 wherein said electrical box includes
   integral posts on said peripheral side walls of said outer box; and
   said cover is pivotally attached to said posts.

9. The recessed electrical box of claim 8 including
   ears extending from said cover;
   apertures in said ears; and
   said apertures of said ears received on said posts.

10. The recessed electrical box of claim 8 wherein said cover includes
    a front wall; and
    a stiffening side wall orthogonal to said front wall.

11. The recessed electrical box of claim 10 wherein
    said outer box includes one or more U-shaped slots in said peripheral side walls connecting with said front opening;
    said cover includes one or more U-shaped slots in said stiffening side wall; and
    closure of said cover on said opening of said outer box mates said U-shaped slots of said outer box with said U-shaped slots of said cover thereby providing a cord opening therein.

12. The recessed electrical box of claim 8 wherein
    said first box and said outer box are integrally molded of plastic in one-piece; and
    said cover is molded of plastic in one-piece.

* * * * *